United States Patent
Singh et al.

(10) Patent No.: US 9,392,511 B1
(45) Date of Patent: Jul. 12, 2016

(54) ASSIGNMENT OF MOBILITY CLASSIFICATIONS TO MOBILE DEVICES

(71) Applicant: QUALCOMM Incorporated, San Diego, CA (US)

(72) Inventors: Damanjit Singh, San Diego, CA (US); Rajat Prakash, San Digeo, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/590,883

(22) Filed: Jan. 6, 2015

(51) Int. Cl.
*H04W 36/14* (2009.01)
*H04W 36/00* (2009.01)
*H04W 36/24* (2009.01)
*H04W 88/08* (2009.01)

(52) U.S. Cl.
CPC .......... *H04W 36/0083* (2013.01); *H04W 36/14* (2013.01); *H04W 36/245* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,263,358 B2 | 8/2007 | Chiou | |
| 8,379,597 B2 | 2/2013 | De Sanctis et al. | |
| 2005/0288020 A1* | 12/2005 | Cho | H04W 16/10 455/436 |
| 2005/0288027 A1* | 12/2005 | Cho | H04W 36/18 455/442 |
| 2012/0009972 A1* | 1/2012 | Viering | H04W 36/22 455/525 |
| 2012/0178450 A1 | 7/2012 | Kuru et al. | |
| 2012/0213162 A1* | 8/2012 | Koo | H04W 16/14 370/329 |
| 2013/0084871 A1 | 4/2013 | Kitaji et al. | |
| 2013/0242919 A1* | 9/2013 | Koo | H04W 72/082 370/329 |
| 2013/0273919 A1* | 10/2013 | Sashihara | H04W 36/30 455/436 |
| 2014/0031036 A1* | 1/2014 | Koo | H04W 36/14 455/434 |
| 2014/0057634 A1* | 2/2014 | Chang | H04W 36/32 455/437 |
| 2014/0187243 A1* | 7/2014 | Rune | H04W 36/26 455/436 |
| 2014/0274049 A1 | 9/2014 | Singh et al. | |
| 2015/0045028 A1 | 2/2015 | Singh et al. | |

FOREIGN PATENT DOCUMENTS

| | | |
|---|---|---|
| WO | WO-2012166033 A1 | 12/2012 |
| WO | WO-2013126811 A1 | 8/2013 |
| WO | 2013164033 A1 | 11/2013 |

OTHER PUBLICATIONS

3GPP TS 36.300: "LTE; Evolved Universal Terrestrial Radio Access (E-UTRA) and Evolved Universal Terrestrial Radio Access Network (E-UTRAN), Overall description; Stage 2, Release 12", ETSI TS 136 300, Version 12.3.0, Sep. 2014, 230 pages.

(Continued)

*Primary Examiner* — Diane Mizrahi
(74) *Attorney, Agent, or Firm* — Austin Rapp & Hardman

(57) ABSTRACT

A method for enhancing assignment of mobility classifications to mobile devices is described. A plurality of mobility classifications are stored in association with a plurality of mobile devices to indicate, for each mobile device, one or more handover parameters used by the mobile device. One or more handover parameters associated with the plurality of mobility classifications are updated based on mobility events. An error determination is made that one or more of the one or more mobile devices are incorrectly associated with the mobility classifications based on the one or more updated handover parameters for the plurality of mobility classifications. In response to the error determination, one or more new criteria are established that adjust how the mobility classifications are assigned.

30 Claims, 15 Drawing Sheets

UE 306 present at the edge of two access points may ping-pong between them (i.e.. RF neighbors)

UE 318 present in a pilot pollution area ping-pongs between the RF neighbors

(56) References Cited

OTHER PUBLICATIONS

"3rd Generation Partnership Project; Technical Specification Group Radio Access Network; Study on next generation Self-Optimizing Network (SON) for UTRAN and E-UTRAN (Release 12)"~ 3GPP Standard; 3GPP TR 37.822, 3rd Generation Partnership Project (3GPP) Mobile Competence Centre; 650, Route Des Lucioles; F-06921 Sophia-Antipolis Cedex; France, vol. RAN WG3, No. V12.0.0, Jun. 27, 2014, pp. 1-19, XP050774456, [retrieved on Jun. 27, 2014].

International Search Report and Written Opinion—PCT/US2015/063376—ISA/EPO—Feb. 12, 2016.

* cited by examiner

ASSIGNMENT OF MOBILITY CLASSIFICATIONS TO MOBILE DEVICES

TECHNICAL FIELD

This disclosure relates generally to the field of communications and more specifically to systems and methods for enhancing assignment of mobility classifications to mobile devices.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmission power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), ultra-mobile broadband (UMB), evolution data optimized (EV-DO), etc.

In any type of base station deployment, an active high-speed mobile device may go through frequent handovers between adjacent base stations. Additionally, even a stationary or slow-moving mobile device can experience frequent handovers due to channel fading if the mobile device is present at a location where pilot signals from different base stations are about the same strength (i.e., pilot pollution). These frequent handovers between base stations are undesirable as they can cause packet losses, leading to voice artifacts, packet delays, and/or poor user experience, as well as increase signaling load at the base station and/or core network. Thus, it is desirable to regulate frequent mobile device handovers.

SUMMARY

The following presents a simplified summary of one or more aspects of systems and methods for enhancing assignment of mobility classifications to mobile devices. A mobility classification may be a class or category into which one or more mobile devices may be grouped based on shared qualities or characteristics that relate to how a mobile device moves in a wireless communication system. The shared qualities or characteristics may also relate to how a mobile device interacts with other devices in the wireless communication system as the mobile device moves about the wireless communication system.

This summary is not an extensive overview of all contemplated aspects, and is intended to neither identify key or critical elements nor delineate the scope of any or all aspects thereof. Its sole purpose is to present some concepts of one or more aspects in a simplified form as a prelude to the more detailed description that is presented later.

In general, the systems and methods disclosed herein provide mechanisms for enhancing assignment of mobility classifications to mobile devices. In one aspect, a method may include storing a plurality of mobility classifications in association with one or more mobile devices such that the mobility classifications indicate, for each mobile device, one or more handover parameters used by the mobile device. The method may further include updating the one or more handover parameters associated with the plurality of mobility classifications based on mobility events. The method may further include making an error determination that at least one of the one or more mobile devices is erroneously associated with the mobility classifications based on the one or more updated handover parameters for the plurality of mobility classifications. The method may also include establishing, in response to the error determination, one or more new criteria that adjust how the mobility classifications are assigned.

Storing the plurality of mobility classifications may comprise storing a first mobility classification in association with a first subset of the one or more mobile devices and a second mobility classification in association with a second subset of the one or more mobile devices. The first mobility classification may comprise a non-ping-pong user classification and the second mobility classification may comprise a ping-pong user classification.

The method may further comprise, prior to making the error determination, applying one or more initial criteria to the mobile devices, and associating the first subset with the first mobility classification and the second subset with the second mobility classification based on results of applying the one or more initial criteria.

A previous serving cells history may exist in association with each of the mobile devices. Each previous serving cells history may comprise data regarding one or more previous serving cells of the mobile device. Applying the one or more initial criteria may comprise analyzing the previous serving cells histories to identify one or more mobile devices that have a certain repetition of one or more serving cells in a certain number of previous serving cells, and assigning the second mobility classification to each mobile device that has the certain repetition of one or more serving cells in the certain number of previous serving cells. The previous serving cells history of a mobile device may comprise UE History Information.

The one or more new criteria may relate to more repetition of one or more serving cells in a certain number of cell changes or less repetition of one or more serving cells in a certain number of cell changes. The one or more new criteria may also relate to a higher ratio of repetition of one or more serving cells in the previous serving cells history or a lower ratio of repetition of one or more serving cells in the previous serving cells history.

The method may further comprise assigning the first mobility classification to each mobile device that is not assigned the second mobility classification or does not have repetition of a serving cell in the certain number of previous cells such that one of the first mobility classification and the second mobility classification is assigned to each of the one or more mobile devices.

The method may comprise, prior to making the error determination, receiving data regarding communication of the one or more mobile devices with base stations, and analyzing the data to identify mobility events and ping-pong handovers.

The method may further comprise, prior to making the error determination, storing a first initial set of handover parameters that influence management of handovers of the first subset between the base stations, and storing a second initial set of handover parameters that influence management of handovers of the second subset between the base stations.

The method may further comprise storing, in response to identifying the at least one event, at least one of a first new set of handover parameters that supplements or replaces the first initial set of handover parameters to influence management of handovers of the first subset between the base stations, and a second new set of handover parameters that supplements or replaces the second initial set of handover parameters to influence management of handovers of the second subset between the base stations.

In one aspect, making the error determination may comprise comparing the first new set of handover parameters with the first initial set of handover parameters to conclude that the first new set of handover parameters is less permissive of handovers between the base stations than the first initial set of handover parameters, and determining, in response to the conclusion, that one or more mobile devices of the first subset are erroneously associated with the first mobility classification.

In another aspect, making the error determination may comprise comparing the second new set of handover parameters with the second initial set of handover parameters to conclude that the second new set of handover parameters is more permissive of handovers between the base stations than the second initial set of handover parameters, and determining, in response to the conclusion, that one or more mobile devices of the second subset are erroneously associated with the second mobility classification.

In still another aspect, making the error determination may comprise comparing the first new set of handover parameters with the second new set of handover parameters to observe a reduction in difference between at least one handover parameter of the first new set of handover parameters and at least one handover parameter of the second new set of handover parameters, and determining, in response to the observation, that one or more mobile devices of the first subset are erroneously associated with the first mobility classification or one or more mobile devices of the second subset are erroneously associated with the second mobility classification.

In yet another aspect, making the error determination may comprise determining that one or more mobile devices of the first subset are erroneously associated with the first mobility classification, wherein, compared with one or more initial criteria used to assign the second mobility classification to the second subset, the one or more new criteria facilitate assignment of the second mobility classification to the one or more mobile devices.

In another aspect, making the error determination may comprise determining that one or more mobile devices of the second subset are erroneously associated with the second mobility classification, wherein, compared with one or more initial criteria used to assign the first mobility classification to the first subset, the one or more new criteria facilitate assignment of the first mobility classification to the one or more mobile devices.

In yet another aspect, making the error determination may further comprise determining that one or more mobile devices of the first subset are erroneously associated with the first mobility classification and one or more mobile devices of the second subset are erroneously associated with the second mobility classification, wherein, compared with one or more initial criteria used to assign the first mobility classification to the first subset, the one or more new criteria facilitate assignment of the first mobility classification to the one or more mobile devices.

The method may further comprise storing the one or more new criteria, and applying the one or more new criteria to assign one of the first mobility classification and the second mobility classification to the one or more mobile devices. The revised mobility classification criteria may more accurately classify mobile devices going forward. If desired, further refinement of the criteria may be undertaken via repetition of the steps set forth above.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
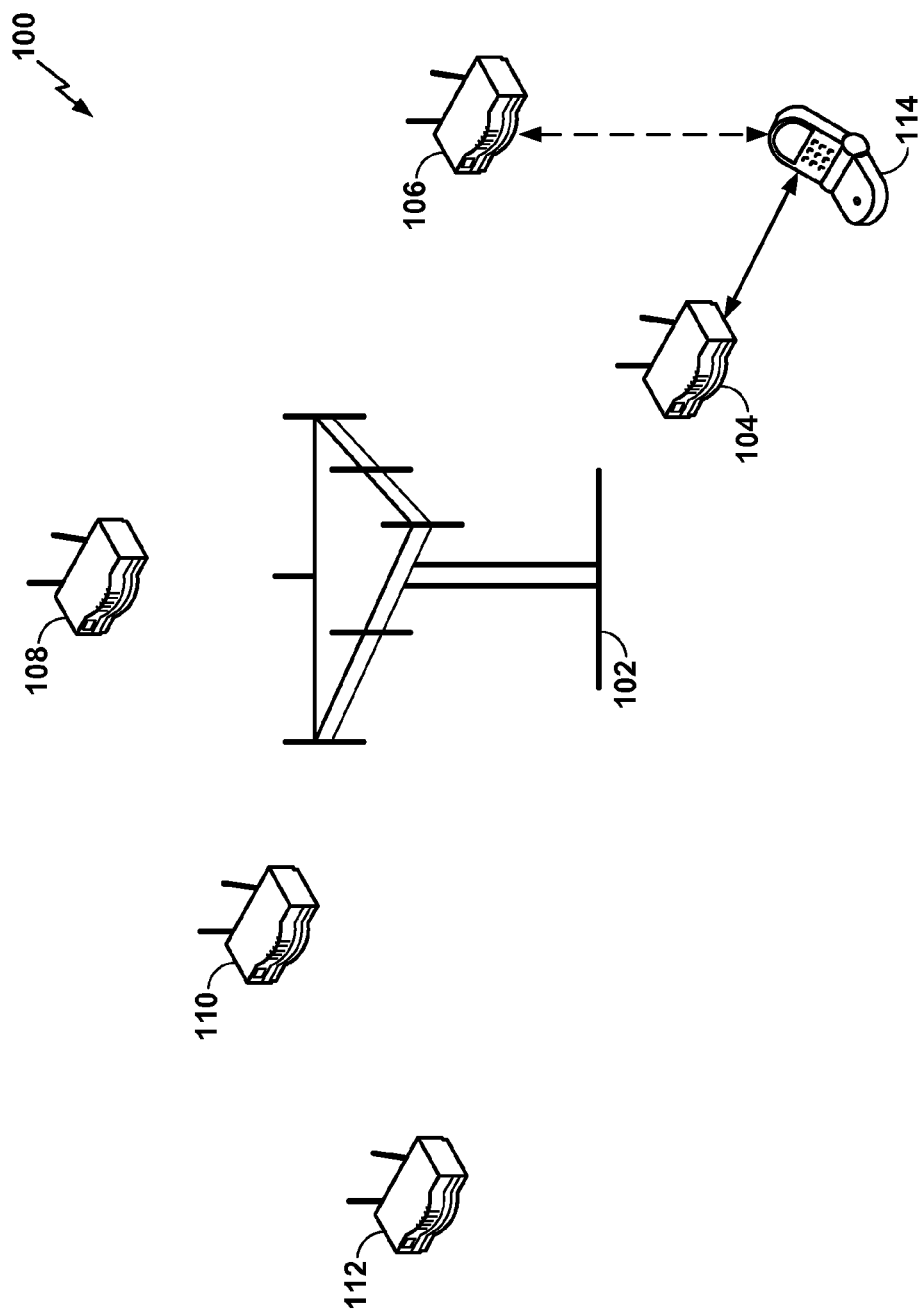
FIG. 1 is a block diagram of an exemplary system that facilitates regulation of frequent handovers between access points.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In various aspects, systems and methods for enhancing regulation of frequent handovers by mobile devices between adjacent base stations are disclosed.

A mobile device can be called a system, device, subscriber unit, subscriber station, mobile station, mobile, remote station, mobile terminal, remote terminal, access terminal, user terminal, terminal, communication device, user agent, user device, or user equipment (UE). A mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected via a wireless modem to one or more base stations (BS) that provide cellular or wireless network access to the mobile device.

A base station (BS) may be utilized for communicating with mobile device(s). To supplement conventional base stations, low-power base stations can be deployed to provide more robust wireless coverage to mobile devices. For example, low-power base stations may also be referred to as an access point, small-cell node, femto node, a pico node, micro node, a Node B, evolved Node B (eNB), home Node B (HNB) or home evolved Node B (HeNB), collectively referred to as H(e)NB, femto nodes, femtocell nodes, pico nodes, micro nodes, or some other terminology. These low-power base stations can be deployed for incremental capacity growth, richer user experience, in-building or other specific geographic coverage, and/or the like. For example, a low-power base station may transmit at a relatively low power as compared to a macro base station associated with a wireless wide area network (WWAN). As such, the coverage area of the low-power base station can be substantially smaller than the coverage area of a macro base station. In some configurations, such low-power base stations are connected to the Internet via broadband connection (e.g., digital subscriber line (DSL) router, cable or other modem, etc.), which can provide the backhaul link to the mobile operator's network. In this regard, low-power base stations are often deployed in homes, offices, etc. without consideration of a current network environment.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

The techniques described herein may be used for various wireless communication systems such as CDMA, TDMA, FDMA, OFDMA, SC-FDMA, Wi-Fi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE, and GSM are described in documents from an organization named the "3rd Generation Partnership Project" (3GPP). Additionally, cdma2000 and UMB are described in documents from an organization named the "3rd Generation Partnership Project 2" (3GPP2). Further, such wireless communication systems may additionally include peer-to-peer (e.g., mobile-to-mobile) ad hoc network systems that often use unpaired unlicensed spectrums, 802.xx wireless LAN, BLUETOOTH, and any other short- or long-range wireless communication techniques.

Various aspects or features will be presented in terms of systems that may include a number of devices, components, modules, and the like. It is to be understood and appreciated that the various systems may include additional devices, components, modules, etc., and/or may not include all of the devices, components, modules, etc. discussed in connection with the figures. A combination of these approaches may also be used.

FIG. 1 shows an exemplary wireless communication system 100. System 100 includes a macro base station 102 that can provide one or more devices with access to a wireless network, as well as a plurality of small-cell nodes 104, 106, 108, 110, and 112, which can also provide wireless network access over a backhaul link (not shown) with a mobile network over a broadband Internet connection. In one example, small-cell nodes 104, 106, 108, 110, and/or 112 can include other types of low-power base stations, relay nodes, devices (e.g., communicating in peer-to-peer or ad-hoc mode with other devices), etc. Each small-cell node may form a small cell (not shown in FIG. 1, but described in greater detail below in FIG. 9). Moreover, system 100 includes a mobile device 114 that may communicate with one or more of the small-cell nodes 104 and/or 106 to receive wireless access to the mobile network.

In the depicted small-cell deployment, due to the small coverage area of each small cell, an active high-velocity mobile device 114 may go through frequent handovers between adjacent small cells (e.g., small-cell nodes 104, 106, 108, 110, and 112). Additionally, even a stationary or slow-moving mobile device 114 can experience frequent handovers due to channel fading if it is present at a location where pilot signals from different small-cell nodes are about the same strength (i.e., pilot pollution). These frequent handovers between small cells are undesirable as they can cause packet losses, leading to voice artifacts, packet delays, and/or poor user experience, as well as increase signaling load at the small-cell nodes and/or the core network. Thus, it may be desirable to regulate such frequent mobile device handovers between small cells.

Furthermore, frequent mobile device handovers may also occur between larger cells and/or between larger cells and small cells. For example, one or more mobile devices may communicate directly with the base station 102 and an adjacent base station 102 (not shown). Such mobile devices may experience frequent handovers between the base stations 102 due to mobile device motion, pilot pollution, or other causes as described above. Hence, it may also be desirable to regulate frequent mobile device handovers between larger base stations. The following description may describe regulation of small-cell communications, but may be equally applicable to other types of base stations.

Figure 2:
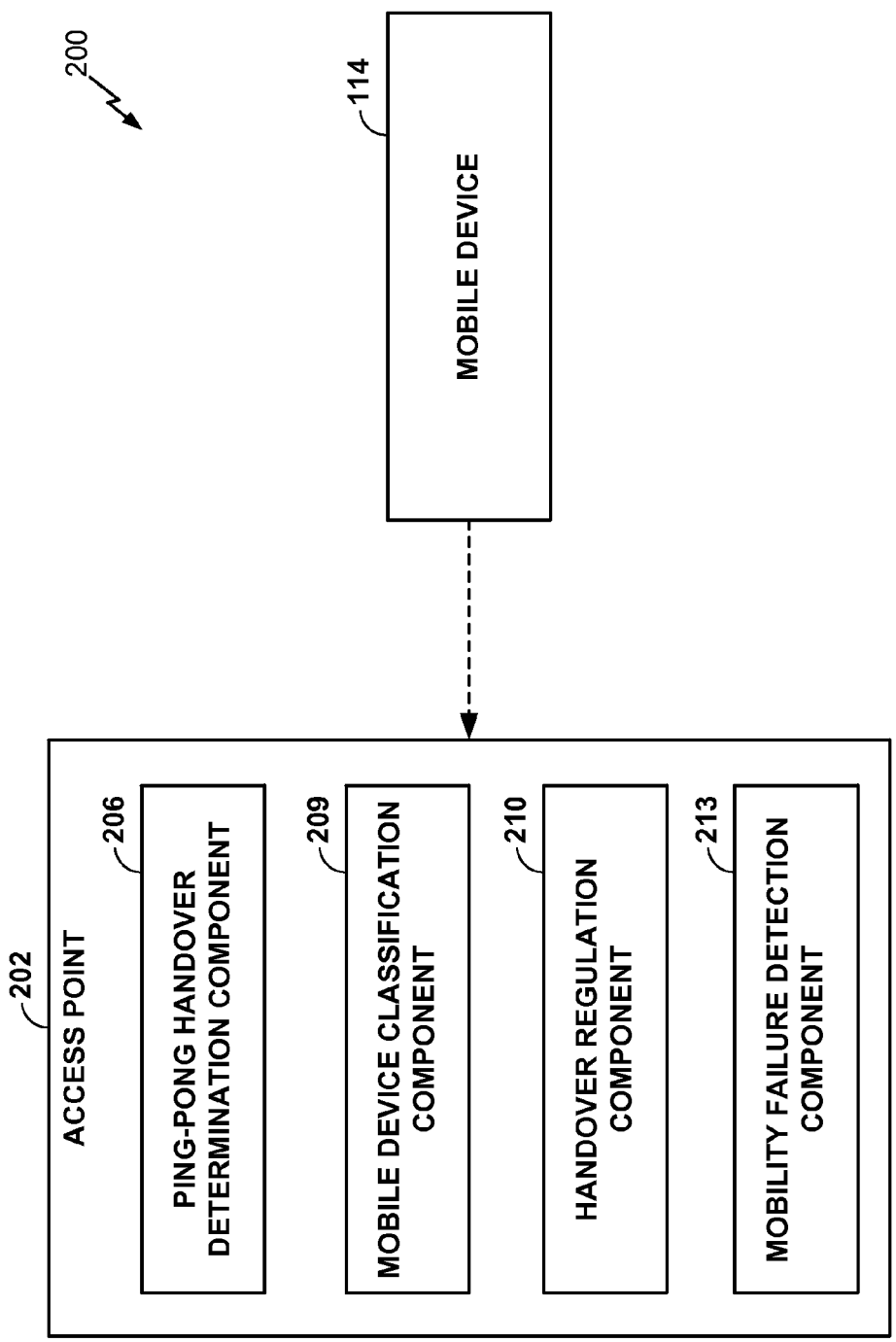
FIG. 2 is a block diagram of an exemplary system that facilitates regulation of frequent handovers between access points according to one aspect.

FIG. 2 illustrates an exemplary system 200 for regulating frequent mobile device handovers between adjacent access points. System 200 includes an access point 202, which may be substantially any low-power base station or macro base station, and can, in one example, include one or more of small-cell nodes 104, 106, 108, 110, and/or 112 (FIG. 1), as described herein. In general, the access point 202 may include a ping-pong handover determination component 206, a mobility failure detection component 213, a mobile device classification component 209, and a handover regulation component 210. Each of the components will be described in greater detail herein below.

The ping-pong handover determination component 206 may be configured to determine whether the mobile device 114, which became recently connected to the access point 202 as a result of handover from an adjacent access point, is subject to a ping-pong handover. Alternatively or additionally, the ping-pong handover determination component 206 can be configured to determine whether the mobile device 114, which is connected to the access point 202, but is in the process of connecting to an adjacent access point as a result of handover, is subject to a ping-pong handover.

In one aspect, to determine whether the mobile device 114 experiences a ping-pong handover, the component 206 of access point 202 may be configured to obtain a previous serving cells history for a mobile device. For example, in UMTS/LTE systems, the previous serving cells history may be obtained from "UE History Information" information element (IE), which can be passed during the handovers from the source cell to the target cell. This IE may contain information for the cells (e.g., up to 16) that a mobile device has been served by in active state prior to the target cell. For each of these cells, this IE may contain cell identity, cell type (e.g., macro, femto, verysmall, small, medium, large, etc.), and the time the mobile device stayed in that cell.

Figure 3A:
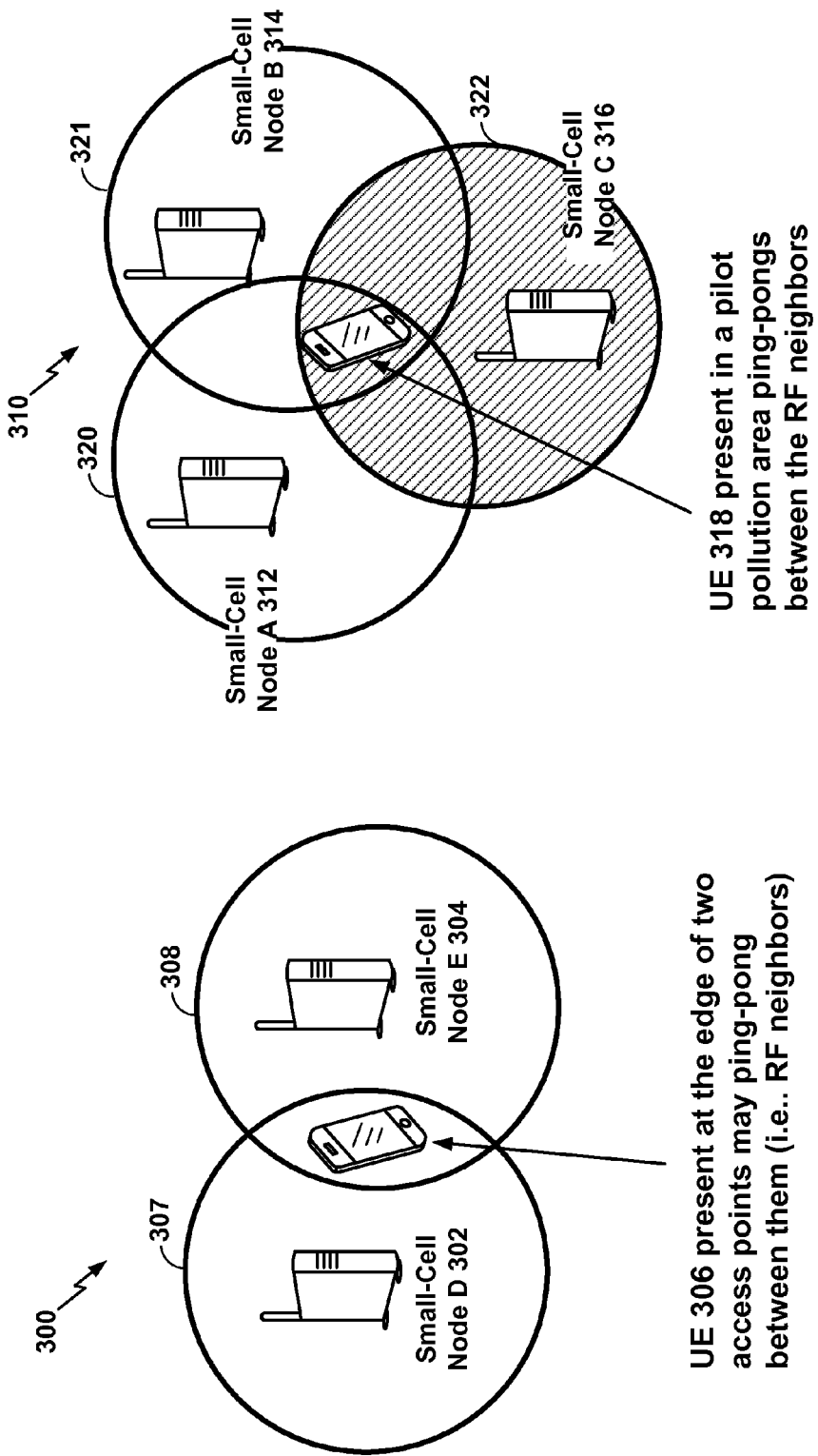
FIGS. 3A and 3B are diagrams of exemplary systems in which regulation of frequent handovers may be performed.

Having obtained the previous serving cells history, the ping-pong handover determination component 206 may implement one or more detection schemes for determining whether the mobile device 114 is subject to ping-pong handover. For example, the ping-pong handover determination component 206 may first identify past serving cells from the mobile device "UE History Information" IE. For example, 'Cell ID'/'PLMN identity' field in 'Last Visited UTRAN Cell Information' IE or 'Last Visited E-UTRAN Cell Information' IE can be used for this purpose. Then, component 206 may check one or more of the following conditions:

Condition 1—Check if the last 'n' handovers have happened between the cells, which are RF neighbors of the current cell. The above condition takes care of the scenarios in which mobile device 114 is at the edge of the two small cells or present in a pilot pollution area as shown in FIG. 3A; and Condition 2—Check if in the last 'n' handovers, the cell identity of a cell has repeated 'x' times.

The ping-pong handover determination component 206 may classify handovers as ping-pong handovers if one or both of the above conditions are met. Those of skill in the art will appreciate that there may be other conditions that could be used to classify handovers as ping-pong handovers.

The mobility failure detection component 213 may detect mobility/connection failures. These mobility/connection failures may be detected by Mobility Robustness Optimization (MRO) as defined in 3GPP TS 36.300 Release 9 and onward. MRO may detect failures such as 'Too Late Handover,' 'Too Early Handover,' and 'Handover to Wrong Cell,' as described in 3GPP TS 36.300.

The mobile device classification component 209 may assign a mobility classification to each mobile device, such as the mobile device 114. Thus, the mobile devices 114 that communicate on the network may be grouped into multiple subsets, with one subset for each mobility classification. In some examples, only two mobility classifications may be used. These may include a first mobility classification for mobile devices not experiencing ping-pong handovers (a first subset of the mobile devices on the network), and a second mobility classification for mobile devices experiencing ping-pong handovers (a second subset of the mobile devices on the network). These mobility classifications may be termed a non-ping-pong user classification and a ping-pong user classification, respectively.

These mobility classifications may be obtained from analysis of previous serving cells history as described above, and may thus reflect an expectation regarding the future performance of each mobile device that communicates over the network. For example, since the mobile devices of the second subset have exhibited ping-pong handover in the past, they may be expected to experience ping-pong handover in the future. Similarly, since the mobile devices of the first subset have not exhibited ping-pong handover in the past, they may not be expected to experience ping-pong handover in the future.

The mobile device classification component 209 may be used to assign a mobility classification to the mobile device, based on the determinations made by the ping-pong handover determination component 206. As indicated previously, this may entail assignment of one of two or more classes to the mobile device. In some configurations, the mobility classifications may include a first mobility classification for mobile devices that are not expected to experience ping-pong handovers. The mobility classifications may further include a second mobility classification for mobile devices that are expected to experience ping-pong handovers. In other configurations, more than two mobility classifications may be assigned to the mobile devices.

Having classified the frequent handover (and thus, the mobile device) as ping-pong handover, the access point 202 may use handover regulation component 210 to regulate handover of the mobile device 114. In one aspect, the component 210 may use the following rules/actions based on the determination and classification of frequent handovers.

If the historical handovers for a mobile device are classified as 'ping-pong handovers,' then access point 202 can make handover more difficult between the ping-ponging (or neighboring) cells, for this mobile device. This may be done by adjusting handover parameters (parameters used for triggering handover events) for the mobility classification applied to the mobile device to make handovers more difficult. For example, in UMTS, one way to achieve this would be by configuring handover parameters for the mobile device differently in the 'Measurement Control' message. In another example, in LTE, one way to achieve this may be by configuring handover parameters for the mobile device differently in the 'RCConnectionReconfiguration' message. In certain configurations, handover parameters may be governed by the following inequalities, which may be applied to determine whether a neighboring base station has become better (by at least an offset) than the base station through which the mobile device is currently communicating:

Entering Condition: $Mn+Ofn+Ocn-Hys>Ms+Ofs+Ocs+Off$

Leaving Condition: $Mn+Ofn+Ocn+Hys<Ms+Ofs+Ocs+Off$

Satisfaction of the inequality for a given time-to-trigger (TTT) may determine whether handover occurs. For these inequalities, the following definitions may apply:

Of=Frequency-Specific Offsets: −24 dB to +24 dB

M=Measurement of Cells

Oc=Cell Individual Offset: −24 dB to +24 dB

Off=Event Offset: (−30 to +30)*0.5=−15 dB to +15 dB

Hys=Hysteresis: INTEGER (0 . . . 30)*0.5=0 dB to 15 dB

One or more values in the inequalities above may be adjusted to restrict and/or delay handovers for mobile devices assigned to a ping-pong handover classification. For example, increasing the values of Hys and/or TTT parameters may delay triggering of handover events to all small cells. As another example, a reported range constant parameter may be used in addition to those set forth above. As a further example, decreasing the value of the reported range constant parameter may delay triggering of handover events to small cells. As yet another example, decreasing the value of Oc parameter for a small cell may decrease the delay in triggering handover events for that small cell.

The inequalities set forth above are merely exemplary. In other implementations, handover parameters may be different from those set forth above. Such other handover parameters may include, but are not limited to, measurement identity, event identity, event type, event offset (such as Event A3 offset), measurement type, reporting interval, amount of reporting, threshold, filter coefficient, Use Oc, cells for measurement, compressed-mode parameters, measurement gaps configuration, and frequency offset. The above list of parameters is not exhaustive and other parameters that trigger handover events both at the mobile device and access point may be configured in other aspects.

If desired, access point 202 can delay handover to the cells involved in ping-pong handovers. For example, after the mobile device 114 triggers an event used to initiate handover to a new small cell, the access point 202 may request that the mobile device continue reporting that small cell for a longer-than-usual time to determine whether handover will occur. However, if delaying handovers to ping-ponging small cells does not work (e.g., frequent handovers continue), inter-frequency handover to a macrocell may be initiated by access point 202 as described above.

In addition, although FIG. 2 illustrates an access point 202 that may determine how mobility classifications are assigned (i.e., distributed self-organizing network (SON)), alternatively, the mobility classifications could be determined at a network entity (i.e., centralized or hybrid SON). In that scenario, the network entity may communicate the mobility classification criteria to the access point 202.

Figure 3B:
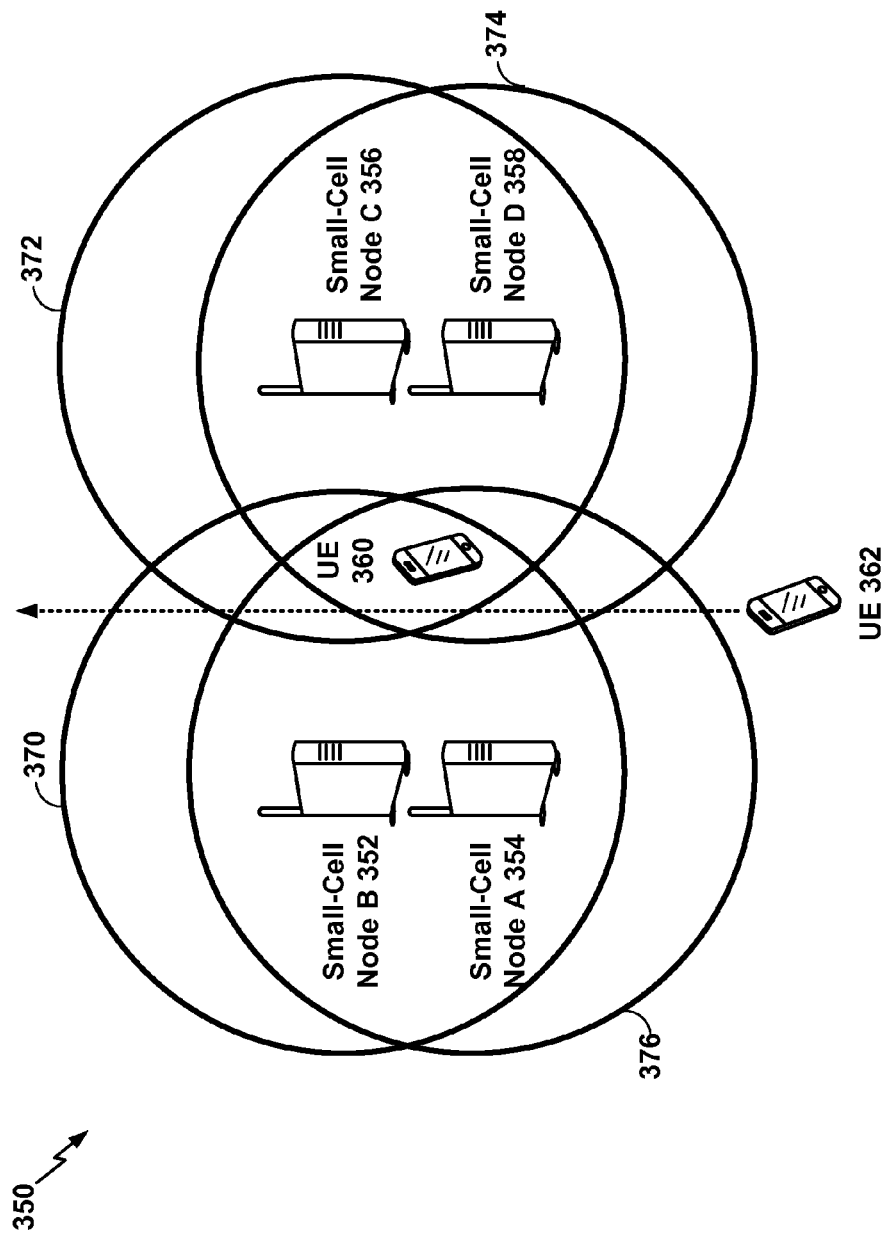

Referring now to FIG. 3B, in a pilot-pollution region 350 including multiple small-cell nodes 352, 354, 356, and 358, handovers performed by either a stationary, slow-moving mobile device 360 or fast-moving (e.g., vehicular) mobile device 362 may be similar. This may lead to mobile devices 360, 362 being misclassified. If a mobile device 362 is misclassified as a member of the second mobility classification (e.g., as a ping-ponging mobile device), the mobile device 362 may experience connection failures due to restrictive handover parameters. If a mobile device 360 is misclassified as a member of the first mobility classification (e.g., as a non-ping-ponging mobile device), it may experience more ping-pong handovers and/or may even be sent to another frequency/RAT layer (which may lead to loss of offload to small cells).

Moreover, once the mobile device 362 leaves the pilot pollution area 350, the mobile device 362 may experience connection failures due to restrictive handover parameters applied to the second mobility classification. Hence, the mobile device 362 may more appropriately belong to the first subset, and should receive the first mobility classification.

Even for mobile devices that that are being correctly classified, misclassifications may still occur in the future. Periodically, the metrics used to classify a mobile device, such as those described in detail above, may need to be adjusted to compensate for changes in network traffic, new network nodes, or other changes. Accordingly, it would be beneficial to provide systems and methods for detecting that one or more mobile devices are misclassified, and performing one or more remedial steps to correct the misclassification.

Figure 4A:
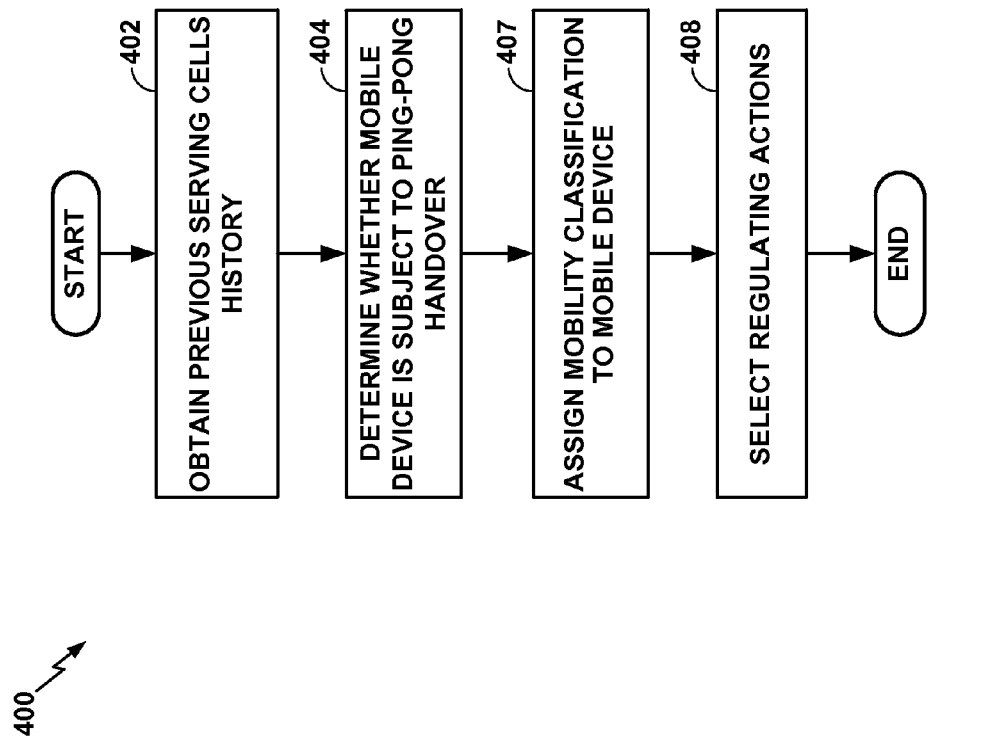
FIGS. 4A and 4B are flow charts of two aspects of exemplary methodologies for regulating frequent handovers.
Figure 4B:
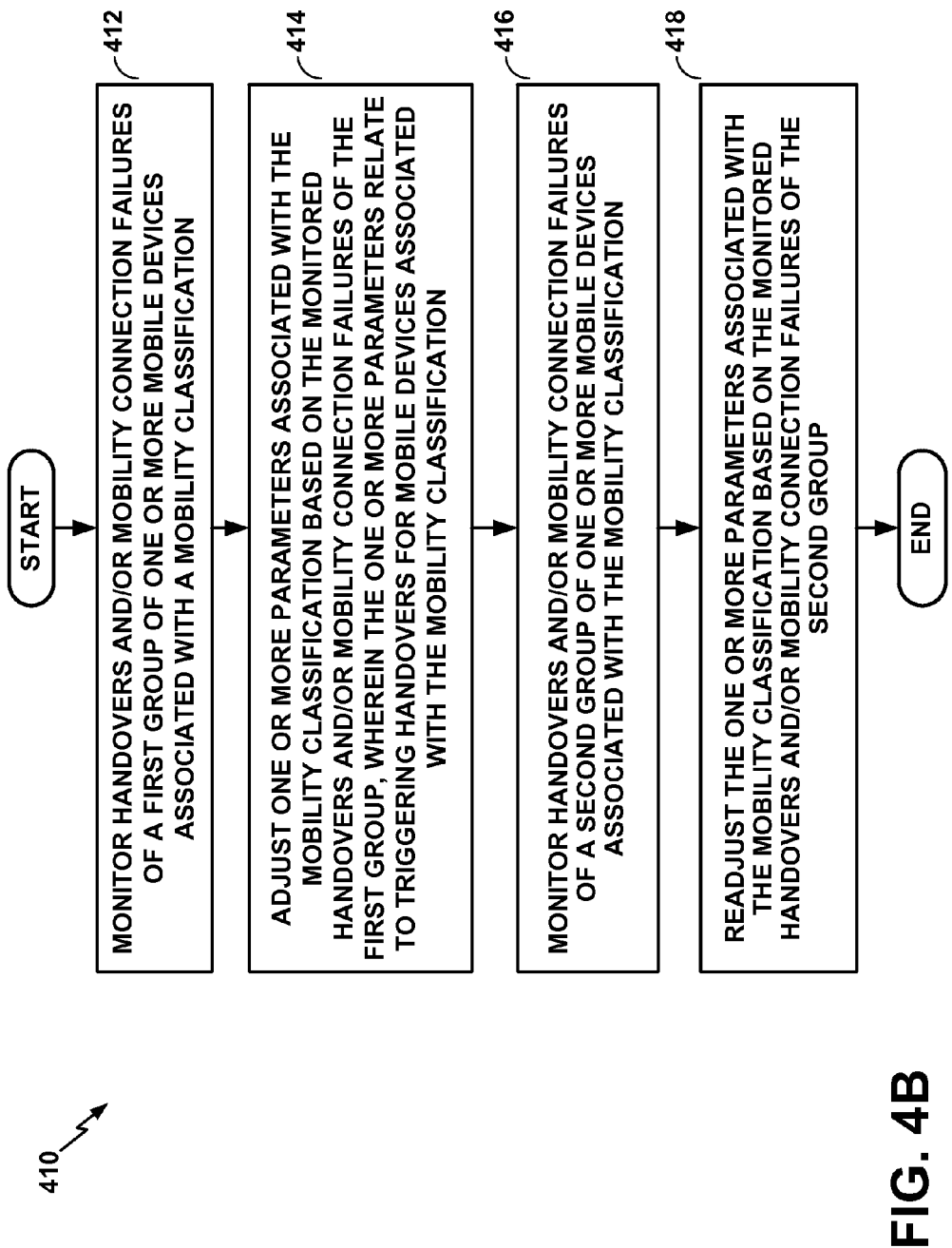

FIGS. 4A and 4B show exemplary methodologies for regulation of frequent handovers between cells. While, for purposes of simplicity of explanation, the methodology is shown and described as a series of acts, it is to be understood and appreciated that the methodology is not limited by the order of acts, as some acts may, in accordance with one or more configurations, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more configurations.

Turning to FIG. 4A, an exemplary methodology 400 is displayed that facilitates regulation of frequent handovers. In one aspect, for example, methodology 400 may be defined in instructions stored on an access point, such as access point 202, or one or more components thereof, and executed by a processor to perform the described acts. At block 402, an access point obtains previous serving cells history information for a mobile device which became recently connected to the access point as a result of handover from an adjacent access point or which is connected to the access point but is in the process of a potential handover to an adjacent access point. In one aspect, the previous serving cells history information can be obtained from the "UE History Information" information element (IE), which can be passed during the handovers from a source cell to a target cell. This IE may contain information for the cells (e.g., up to 16) that a mobile device has been served by in active state prior to the target cell. For each of these cells, IE may contain cell identity, cell type (e.g., macro, femto, verysmall, small, medium, large, etc.), and the time the mobile device stayed in that cell.

At block 404, the access point determines, based on the previous serving cells history, whether the mobile device is subject to ping-pong handovers. At block 406, the access point may determine, for a mobile device with frequent handovers, whether the frequent handovers are ping-pong handovers. At block 407, the access point may assign a mobility classification to the mobile device. At block 408, the access point may select handover regulation actions.

The handover regulation actions may be selected based on the mobility classification assigned in the block 407. For example, if the mobile device is assigned a mobility classification for mobile devices that experience ping-pong handovers, then the access point can make handover of this mobile device to the ping-ponging (or neighboring) cells more difficult by, for example, adjusting handover triggering parameters of the access point and/or mobile device, as described previously. The access point may also increase this difficulty level in steps, by adjusting handover-triggering parameters of the access point and/or mobile device in steps. Alternatively or additionally, the access point can delay handover to the cells involved in ping-pong handovers. If the above described frequent handover regulating actions do not work, then the access point can initiate inter-frequency or inter-RAT handover to a collocated macrocell, as a fallback option. In another example, if handovers are classified as non-ping-pong handovers, due to a slow-moving or stationary user, then the access point can decide to not adjust handover parameters for this mobile device. In yet another example, if handovers are classified as non-ping-pong handovers, due to a fast moving user, then the access point can make handover to neighboring cells easier for this mobile device by adjusting handover-triggering parameters of the access point and/or mobile device. Alternatively, the access point can initiate inter-frequency or inter-RAT handover to a collocated macrocell for this mobile device.

Once the appropriate initial handover parameters and/or other regulating actions for each mobility classification have been selected, they may be applied as the mobile devices of each subset (i.e., each mobility classification) interact with the cells of the network. The initial handover parameters may be used to govern how handovers are managed among the cells. It may be helpful to update the handover parameters periodically to further adjust and/or optimize the handover parameters. Thus, the initial handover parameters for each mobility classification may be replaced and/or supplemented with new handover parameters that are adjusted to provide better performance of the network. This may be done iteratively, with each successive new set of handover parameters replacing and/or supplementing the previously applied set of handover parameters. This process may help the network adapt to changing conditions among the mobile devices as will be shown and described in connection with FIG. 4B.

Turning to FIG. 4B, another exemplary methodology 410 is displayed that facilitates a multi-step regulation of frequent handovers. In one aspect, for example, methodology 410 may be defined in instructions stored on an access point, such as access point 202, or one or more components thereof, and executed by a processor to perform the described acts. At block 412, an access point may monitor handovers (such as regular handovers, ping-pong handovers, etc.) and/or mobility connection failures of a first group of one or more mobile devices associated with a mobility classification. The mobility/connection failures may be detected by Mobility Robustness Optimization (MRO) as defined in 3GPP TS 36.300 Release 9 and onwards. MRO may detect failures such as 'Too Late Handover,' 'Too Early Handover,' and 'Handover to Wrong Cell.' At block 414, the access point may adjust one or more handover parameters associated with the mobility classification based on the monitored handovers and/or mobility connection failures of the first group, wherein the one or more handover parameters relate to triggering handovers for mobile devices associated with the mobility classification. The adjusted one or more handover parameters may be communicated to a second group of one or more mobile devices associated with the mobility classification. The second group of one or more mobile devices may include one or more of the one or more mobile devices in the first group and/or one or more mobile devices connected to the access point that were not part of the first group. Examples of parameter adjustments are provided above.

At block 416, the access point may monitor handovers and/or mobility connection failures of the second group. At block 418, the access point may readjust the one or more handover parameters associated with the mobility classification based on the monitored handovers and/or mobility/connection failures of the second group. The adjusted/readjusted handover parameters may include, but need not be limited to, measurement identity, event identity, event type, event offset (such as Event A3 offset), measurement type, reporting interval, amount of reporting, threshold, hysteresis, TTT, filter coefficient, CIO, use CIO, reporting range constant, cells for measurement, compressed-mode parameters, frequency offset, and/or any of the parameters listed previously in the discussion of handover parameters.

Figure 5:
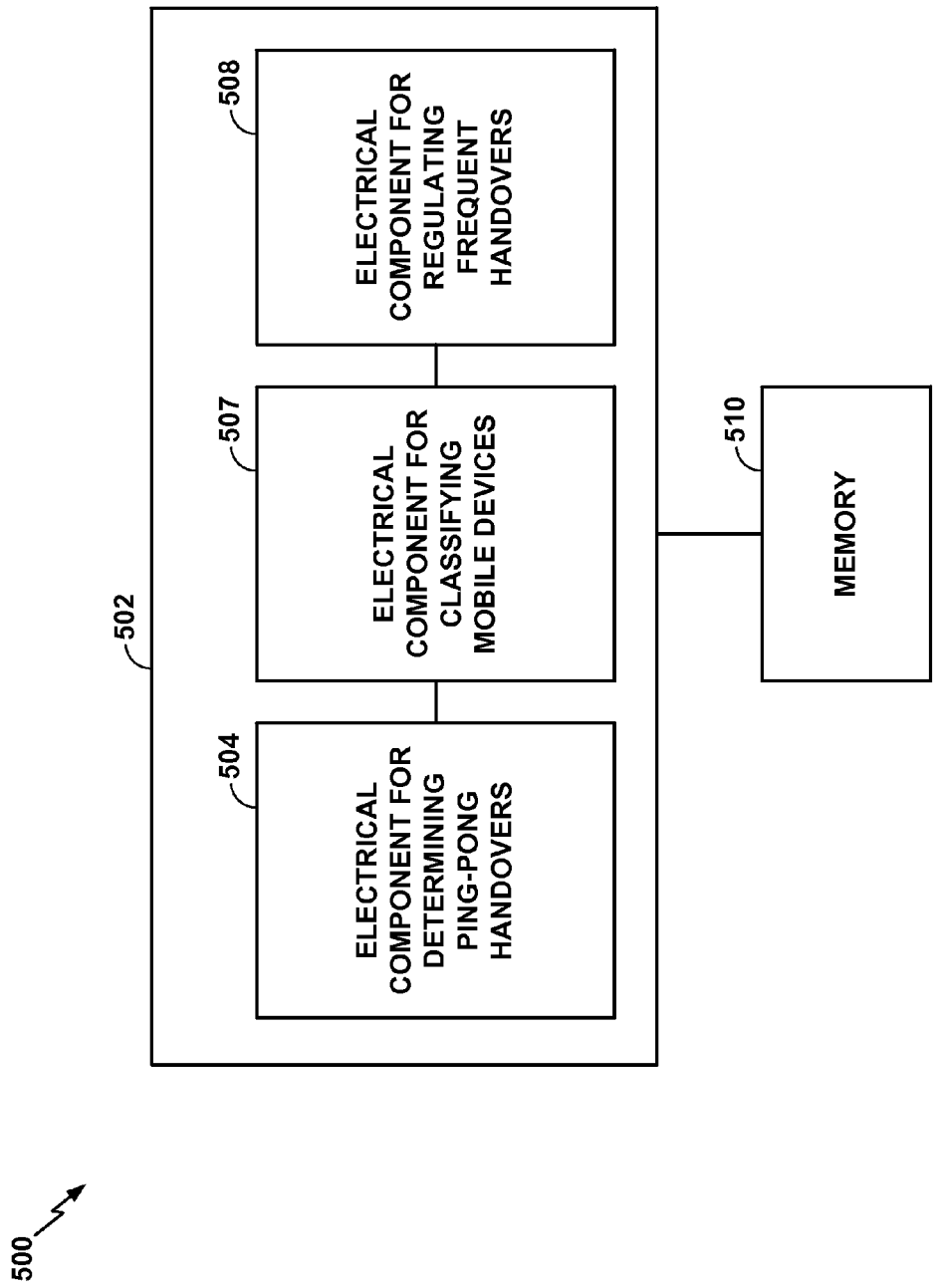
FIG. 5 is a block diagram of an exemplary system that regulates frequent handovers.

FIG. 5 illustrates a system 500 for regulating frequent handovers. For example, system 500 can reside at least partially within an access point. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, logical grouping 502 can include an electrical component 504 for determining frequent handovers using, for example, handover history of the mobile device. Further, logical grouping 502 can include an electrical component 507 for classifying mobile devices based on whether the mobile devices are experiencing ping-pong handovers. Yet further, logical grouping 502 may include an electrical component 508 for regulating frequent handover based on handover classification.

Additionally, system 500 can include a memory 512 that retains instructions for executing functions associated with the electrical components 504, 507, and 508. The memory 512 may additionally or alternatively store mobility classifications assigned by the electrical component 507. The mobility classifications may be stored in association with the mobile devices to which they pertain. According to one configuration, the memory 512 may contain a database containing identifiers for the mobile devices (such as an IMEI, MEID, MAC address, IP address, or other unique hardware-based or software-based identifier) in association with the mobility classifications. If desired, the memory 512 may also contain other information such as the initial classification criteria used to assign the mobility classifications to the mobile devices, handover parameters applicable to each mobility classification, and/or the like. While shown as being external to memory 512, it is to be understood that one or more of the electrical components 504, 507, and 508 can exist within memory 512.

In one example, electrical components 504, 507, and 508 can define at least one processor, or each electrical component 504, 507, and 508 can be a corresponding module of at least one processor. Moreover, in an additional or alternative example, electrical components 504, 507, and 508 can be a computer-program product stored on a computer-readable medium, where each electrical component 504, 507, and 508 can be corresponding code.

Figure 6:
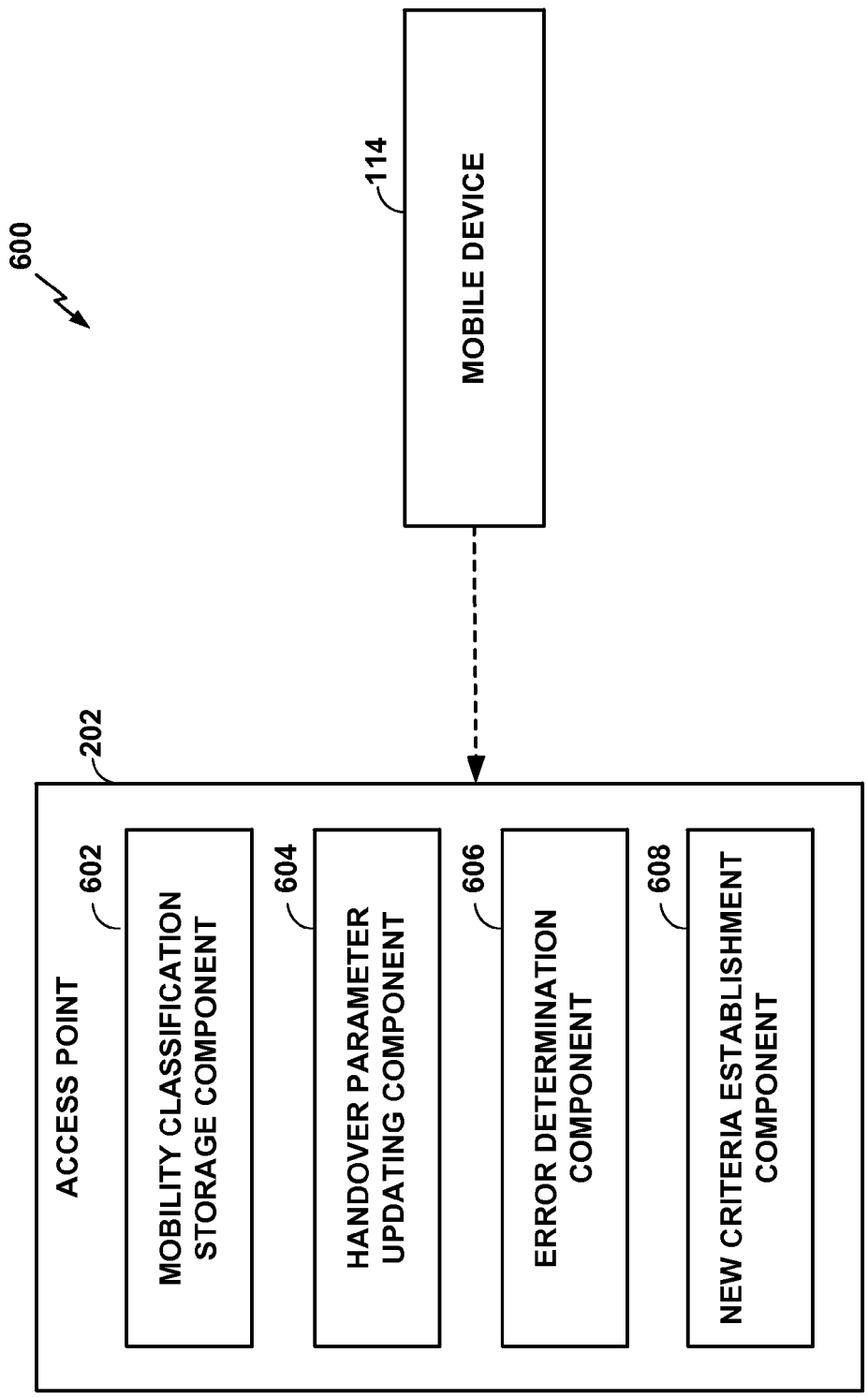
FIG. 6 is a block diagram of an exemplary system that enhances assignment of mobility classifications to mobile devices according to one aspect.

Referring now to FIG. 6, a block diagram illustrates an exemplary system 600 that enhances the assignment of mobility classifications to mobile devices according to one aspect. System 600 includes an access point 202, which can be substantially any macro base station or low-power base station, and can, in one example, include one or more of small-cell nodes 104, 106, 108, 110, and/or 112 (FIG. 1), as described herein. The access point 202 may include various components, as shown in FIG. 6. These components may be present in addition to those of FIG. 2; hence, FIG. 6 is not intended to provide a complete listing of the components of the access point 202. Rather, FIG. 6 illustrates only the components that are designed to enhance the assignment of mobility classifications to mobile devices via correction of mobile device misclassification.

As shown in FIG. 6, the access point 202 includes a mobility classification storage component 602, a handover parameter updating component 604, an error determination component 606, and a new criteria establishment component 608. Each of the components will be described in greater detail herein below.

The mobility classification storage component 602 may store a plurality of mobility classifications in association with one or more mobile devices. The mobility classifications may indicate, for each mobile device, one or more handover parameters used by the mobile device.

The handover parameter updating component 604 may update the one or more handover parameters associated with the plurality of mobility classifications based on mobility events as described in the methodology of FIG. 4B.

The error determination component 606 may determine whether any of the mobile devices have been misclassified (i.e., erroneously classified). This may be done, for example, via analysis of the results of the handover parameter updating component 604 as described in FIG. 4B. More specifically, as mentioned previously, the methodology 410 of FIG. 4B may result in the iterative establishment of new handover parameters for each mobility classification that replace and/or supplement the previous handover parameters for that mobility classification (i.e., the initial handover parameters). The error determination component 606 may compare the new handover parameters with the initial handover parameters for each mobility classification to determine whether the new handover parameters are more or less handover-friendly than the old handover parameters.

Because the methodology includes monitoring the operation of the network (in the block 412 and the block 416) for problem events, such as ping-pong handovers and mobility/connection failures (e.g., 'Too Late Handover,' 'Too Early Handover,' 'Handover to Wrong Cell,' etc.), and adjusting the handover parameters to reduce the incidence of such events, any change occurring in the handover parameters pursuant to the operation of the methodology 410 may be a signal of problems in the manner in which handovers are being carried out. It may be assumed that at least some of the problems detected by the methodology 410 are caused by erroneous classification of mobile devices. The more dramatic the change in handover parameters, the more mobile devices in that mobility classification are likely to have been erroneously classified.

Further, the manner in which the handover parameters are changed pursuant to the methodology (i.e., whether the handover parameters for that mobility classification have been adjusted to be more handover-friendly or less handover-friendly) may indicate whether that mobility classification has been assigned too liberally or too sparingly to the mobile devices on the network. Specifically, if the handover parameters for a non-ping-pong user classification become more restrictive of handovers, it may be assumed that at least some of the mobile devices that have been assigned the non-ping-pong user classification should have a ping-pong user classification. If the handover parameters for the ping-pong user classification become less restrictive of handovers, it may be assumed that at least some of the mobile devices that have been assigned the ping-pong user classification should have the non-ping-pong user classification.

For example, two mobility classifications may be used as described previously: a first mobility classification for mobile devices that are not expected to undergo ping-pong handovers, and a second mobility classification for mobile devices that are expected to undergo such ping-pong handovers. If the handover parameters for the first mobility classification have been changed to become less handover friendly (i.e., more restrictive of handovers), the error determination component 606 may determine that one or more mobile devices that have been assigned the first mobility classification should have the second mobility classification. Conversely, if the handover parameters for the second mobility classification have been changed to become more handover friendly (i.e., less restrictive of handovers), the error determination component 606 may determine that one or more mobile devices that have been assigned the second mobility classification should have the first mobility classification.

The existence of erroneous classification may be particularly evident where the handover parameters of one mobility classification have changed to become more like those of the other mobility classification, and the handover parameters of the other mobility classification have not changed significantly, or have changed to become more distinct from those of the other mobility classification. In such a case, it may be clear that the misclassification is occurring primarily within the subset of mobile devices for which the handover parameters have changed to become more like those of the other mobility classification.

Conversely, where the handover parameters of both mobility classifications have changed, it may not be clear which subset of mobile devices has the preponderance of misclassified mobile devices. Where there are only two mobility classifications, it may then not be clear that either is over-inclusive.

As described above, the error determination component 606 may utilize the change in handover parameters caused by the methodology 410 for each mobility classification of mobile devices to determine the type and severity of a misclassification present within the mobile devices connected to a network. Once this information has been obtained, one or more remedial steps may be taken. In one configuration, the classifications of mobile devices perceived to be erroneously classified may be immediately corrected in response to the error determination reached by the error determination component 606. However, it may be difficult to know exactly which mobile devices have been erroneously classified. Furthermore, classification may typically happen when a mobile device first connects to a base station (via startup connection or handover). Thus, it may be easier to change the criteria applied to classify mobile devices going forward, as handovers occur or mobile devices are activated.

Thus, the new criteria establishment component 608 may utilize the error determination made by the error determination component 606 to establish new criteria for classifying mobile devices. The new criteria may make it easier or more difficult to assign a mobility classification to a mobile device. The new criteria may help compensate for the misclassification as mobile devices connect to base stations to receive mobility classifications, and are classified under the new criteria.

Returning to the example of a first mobility classification for mobile devices that are not expected to have ping-pong handovers, and a second mobility classification for mobile devices that are expected to have ping-pong handovers, the criteria (both initial criteria and new criteria) applied to assign mobile devices to the first mobility classification may be applied in the inverse to assign mobile devices to the second mobility classification. Since there are only two mobility classifications, all mobile devices that do not meet the criteria for assignment to the first mobility classification may receive the second mobility classification. Additionally or alternatively, the criteria may relate to assignment to the second mobility classification; thus, all mobile devices that do not meet the criteria for inclusion in the second mobility classification may receive the first mobility classification.

If the handover parameters for the first mobility classification have been changed to become less handover friendly (i.e., more restrictive of handovers), the error determination component 606 may determine that one or more mobile devices that have been assigned the first mobility classification should have the second mobility classification, as indicated above. The new criteria establishment component 608 may then establish new criteria that make it harder for mobile devices to be assigned the first mobility classification, and easier for mobile devices to be assigned the second mobility classification.

Conversely, if the handover parameters for the second mobility classification have been changed to become more handover friendly (i.e., less restrictive of handovers), the error determination component 606 may determine that one or more mobile devices that have been assigned the second mobility classification should have the first mobility classification, as indicated above. The new criteria establishment component 608 may then establish new criteria that make it harder for mobile devices to be assigned the second mobility classification, and easier for mobile devices to be assigned the first mobility classification.

For the situation described above, in which the handover parameters for the first mobility classification have been changed to become less handover friendly and the handover parameters for the second mobility classification have been changed to become more handover friendly, it may not be clear which mobile devices are erroneously classified. Thus, the new criteria establishment component 608 may take action to facilitate handovers, effectively moving the network toward a default state in which no action is taken to regulate ping-pong handovers. Thus, the new criteria may facilitate assignment of the mobile devices to the first mobility classification. This action may at least facilitate handovers for mobile devices that have been assigned to the second mobility classification, but should instead be assigned to the first mobility classification.

As mentioned previously, the analysis conducted by the error determination component 606 may reveal the severity of the misclassification. If desired, the new criteria establishment component may utilize the severity of the misclassification to determine how different the new criteria will be from the initial criteria. Specifically, for a more severe misclassification, the new criteria establishment component 608 may establish new criteria that differ more dramatically from the initial criteria.

In the alternative, the new criteria establishment component may instead utilize a uniform perturbation to differentiate the new criteria from the initial criteria, regardless of the magnitude of the misclassification. In such an event, future iterations may be expected to establish further new criteria that progressively depart from the initial criteria until the full extent of the misclassification has been compensated for.

The new criteria may differ from the initial criteria in a variety of ways. For example, as set forth in the description of FIG. 2, a mobile device may be considered to be experiencing ping-pong handovers, and thus be classified as a ping-pong user, if one or more of the following conditions is met:

Condition 1—Check if the last 'n' handovers have happened between the cells, which are RF neighbors of the current cell; and Condition 2—Check if in the last 'n' handovers, the cell identity of a cell has repeated 'x' times.

If the new criteria are to make it easier for mobile devices to be classified as ping-pong users, the value of 'n' may be decreased in the first condition. In another configuration, the value of 'x' may be decreased and/or the value of 'n' may be increased in the second condition. In other words, making it easier for mobile devices to be classified as ping-pong users may relate to requiring less repetition of one or more serving cells for a certain number of cell changes or a lower ratio of repetition of one or more serving cells in the previous serving cells history.

If the new criteria are to make it more difficult for mobile devices to be classified as ping-pong users, the value of 'n' may be increased in the first condition. In another configuration, the value of 'x' may be increased and/or the value of 'n' may be decreased in the second condition. In other words, making it more difficult for mobile devices to be classified as ping-pong users may relate to requiring more repetition of one or more serving cells for a certain number of cell changes or a higher ratio of repetition of one or more serving cells in the previous serving cells history.

The foregoing examples relate to criteria by which mobile devices may be assigned a ping-pong user classification. Those of skill in the art will recognize that the criteria set forth above may be easily restated such that meeting the criteria causes the mobile device to be assigned a non-ping-pong user classification (such as the first mobility classification in the two-classification example provided previously), a ping-pong user classification, or a mobility classification in between in the event that more than two mobility classifications are used. Further, those of skill in the art will recognize that a wide variety of criteria different from those of the foregoing examples may be applied to classify mobile devices within the scope of the present disclosure. Thus, new criteria may differ from the initial criteria in ways not specifically set forth herein, while still accomplishing the objective of making it more or less difficult to classify mobile devices as either more or less likely to experience ping-pong handover.

Although the discussion of FIG. 6 focuses on the aspect in which there are only two mobility classifications, the mobility classification storage component 602, the handover parameter updating component 604, the error determination component 606, and the new criteria establishment component 608 may be used in aspects in which there are more than two mobility classifications. The mobility classification storage component 602, the handover parameter updating component 604, error determination component 606, and the new criteria establishment component 608 may follow steps similar to those set forth above. However, in such an aspect, each mobility classification may have its own set of initial criteria that are applied to determine whether mobile devices are assigned to it. If desired, new criteria may be established for one or more, but not all, of the mobility classifications (i.e., the mobility classifications applied to misclassified mobile devices), while the initial criteria are left intact and unmodified for one or more of the mobility classifications (i.e., mobility classifications applied to mobile devices for which there is little or no misclassification).

In addition, although FIG. 6 illustrates an access point 202 that may determine how mobility classifications are assigned (i.e., distributed SON), alternatively, the mobility classifications could be determined at a network entity (i.e., centralized or hybrid SON). In that scenario, the network entity may communicate the mobility classification criteria to the access point 202.

Figure 7:
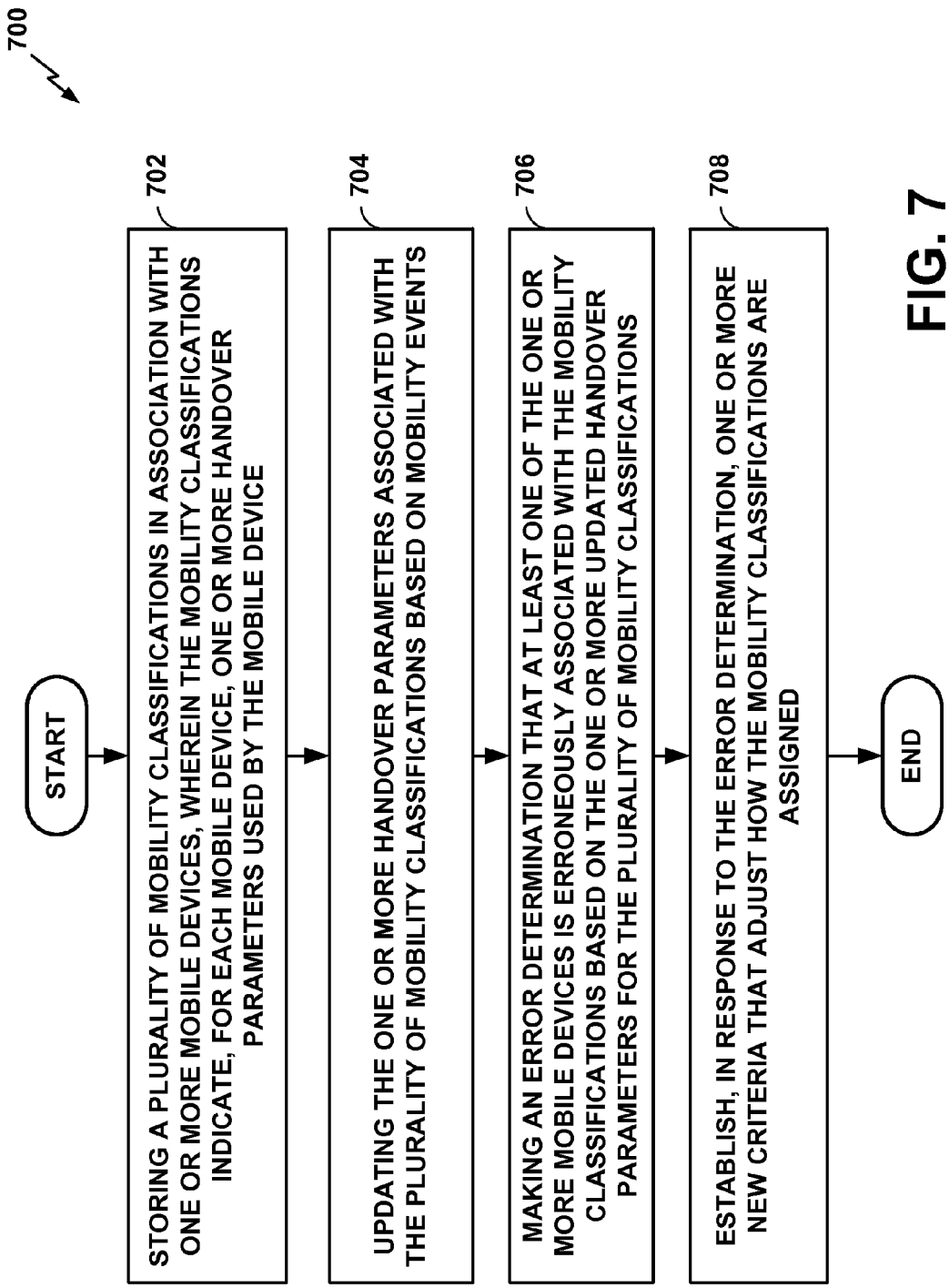
FIG. 7 is a flow chart of one aspect of an exemplary methodology for enhancing assignment of mobility classifications to mobile devices.

FIG. 7 is a flow chart of one aspect of an exemplary methodology 700 for enhancing the assignment of mobility classifications to mobile devices. Like the methodology 400 and the methodology 410, methodology 700 may be defined in instructions stored on an access point 202, or one or more components thereof, and executed by a processor to perform the described acts.

At block 702, an apparatus may store a plurality of mobility classifications in association with one or more mobile devices, wherein the mobility classifications may indicate, for each mobile device, one or more handover parameters used by the mobile device. At block 704, the apparatus may update the one or more handover parameters associated with the plurality of mobility classifications based on mobility events.

At block 706, the apparatus may make an error determination that at least one of the one or more mobile devices is erroneously associated with the mobility classifications based on the one or more updated handover parameters for the plurality of mobility classifications. This determination may include analysis of the data generated by the methodology 410, and more specifically, comparison of the new handover parameters with the initial handover parameters, for each mobility classification. The access point may determine the direction and/or magnitude of the misclassification for each subset of mobile devices. In the event that no significant misclassifications are discovered, the methodology 700 may skip the block 708 and end, until the next iteration.

At a block 708, the access point may establish, in response to the error determination, one or more new criteria that adjust how the mobility classifications are assigned to mobile devices. The new criteria may be selected to compensate for any erroneous classifications discovered in the block 706. This may be done as set forth above, in the description of the new criteria establishment component 608 of FIG. 6.

Figure 8:
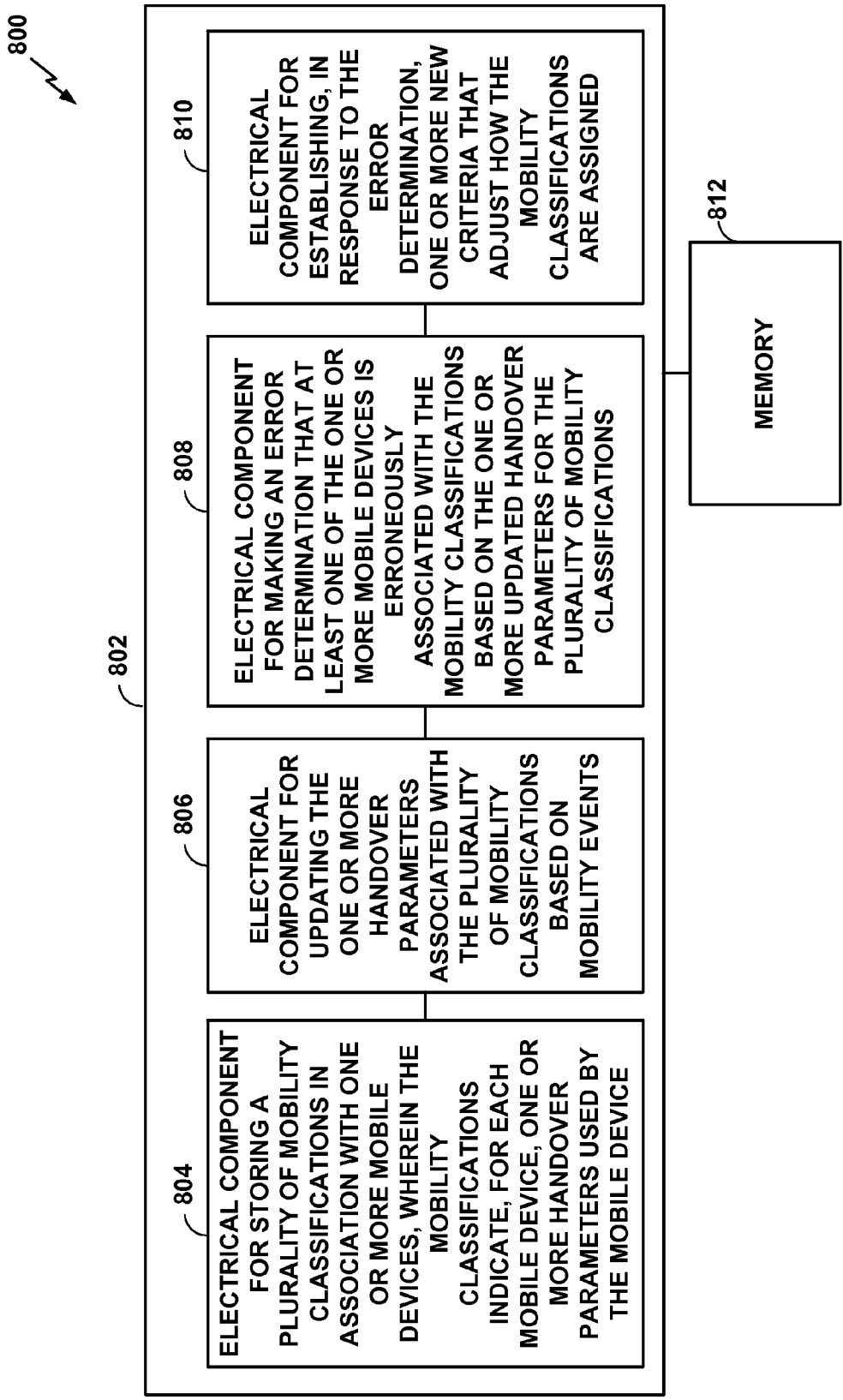
FIG. 8 is a block diagram of an exemplary system that enhances assignment of mobility classifications to mobile devices.

FIG. 8 is a block diagram of an exemplary system 800 that enhances assignment of mobility classifications to mobile devices. The system 800 can reside at least partially within an access point 202. It is to be appreciated that system 800 is represented as including functional blocks, which can be functional blocks that represent functions implemented by a processor, software, or combination thereof (e.g., firmware). The system 800 includes a logical grouping 802 of electrical components that can act in conjunction. As shown, the logical grouping 802 may include: an electrical component 804 for storing a plurality of mobility classifications in association with one or more mobile devices, wherein the mobility classifications indicate, for each mobile device, one or more handover parameters used by the mobile device; an electrical component 806 for updating the one or more handover parameters associated with the plurality of mobility classifications based on mobility events; an electrical component 808 for making an error determination that at least one of the one or more mobile devices is erroneously associated with the mobility classifications based on the one or more updated handover parameters for the plurality of mobility classifications; and an electrical component 804 for establishing, in response to the error determination, one or more new criteria that adjust how the mobility classifications are assigned.

The electrical component 802 may store a plurality of mobility classifications in association with one or more mobile devices as set forth in the description of the mobility classification storage component 602 of FIG. 6.

The electrical component 804 may update the one or more handover parameters associated with the plurality of mobility classifications as set forth in the description of the handover parameter updating component 604 of FIG. 6.

The electrical component 806 may make an error determination that at least one of the one or more mobile devices is erroneously associated with the mobility classifications as set forth in the description of the error determination component 606 of FIG. 6.

The electrical component 808 may establish one or more new criteria that adjust how the mobility classifications are assigned as set forth above in the description of the new criteria establishment component 608 of FIG. 6.

Additionally, system 800 can include a memory 812 that retains instructions for executing functions associated with the electrical components 804, 806, 808, and 810. The memory 812 may additionally or alternatively store new criteria. The new criteria may be stored in association with the mobility classifications to which they pertain. If desired, the memory 510 may also contain other information such as the initial classification criteria used to assign the mobility classifications to the mobile devices, handover parameters applicable to each mobility classification, and/or the like. While shown as being external to memory 812, it is to be understood that one or more of the electrical components 804, 806, 808, and 810 can exist within memory 812.

In one example, electrical components 804, 806, 808, and 810 can define at least one processor, or each electrical component 804, 806, 808, and 810 can be a corresponding module of at least one processor. Moreover, in an additional or alternative example, electrical components 804, 806, 808, and 810 can be a computer-program product stored on a computer-readable medium, where each electrical component 804, 806, 808, and 810 can be corresponding code.

Figure 9:
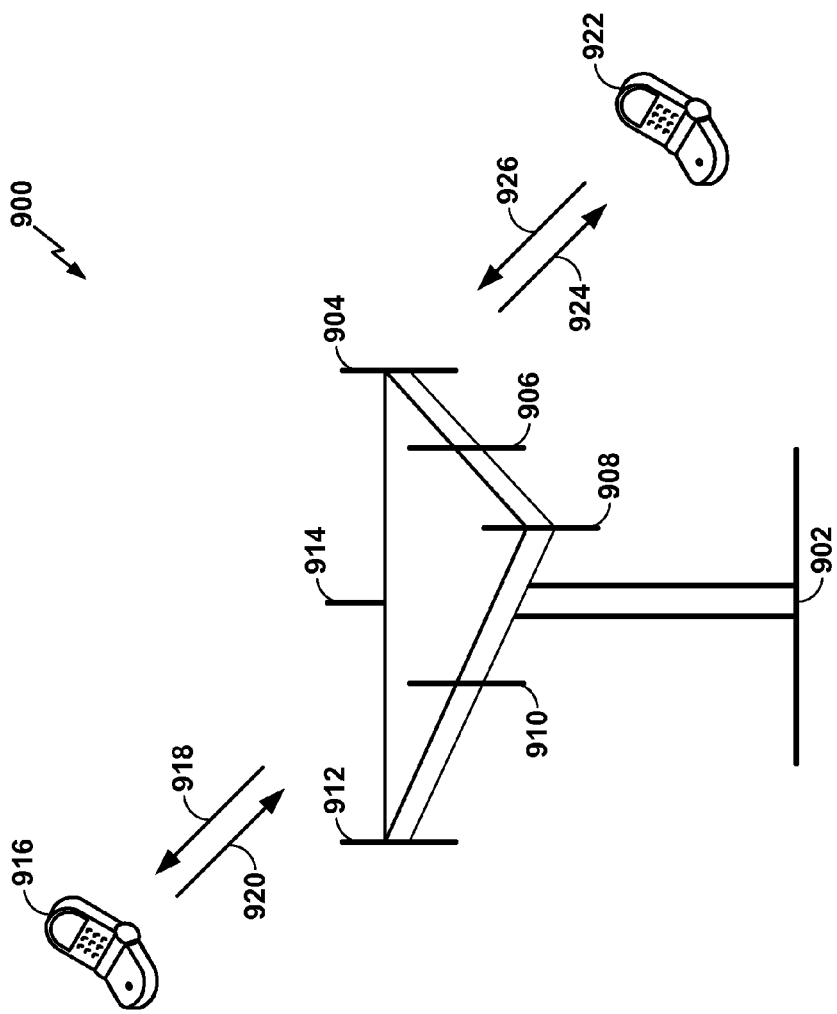
FIG. 9 is a block diagram of an example wireless communication system in accordance with various aspects set forth herein.

Referring now to FIG. 9, an exemplary wireless communication system 900 is illustrated, in which mechanisms for regulation of frequent handover may be implemented. System 900 includes a base station 902, which may be a small-cell node, such as nodes 102 or 202, or system 500, and may include the components and implement the functions described above with respect to FIGS. 1-8. In one aspect, base station 902 can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.).

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology as depicted. According to one example, system 900 can be a multiple-input multiple-output (MIMO) communication system.

Figure 10:
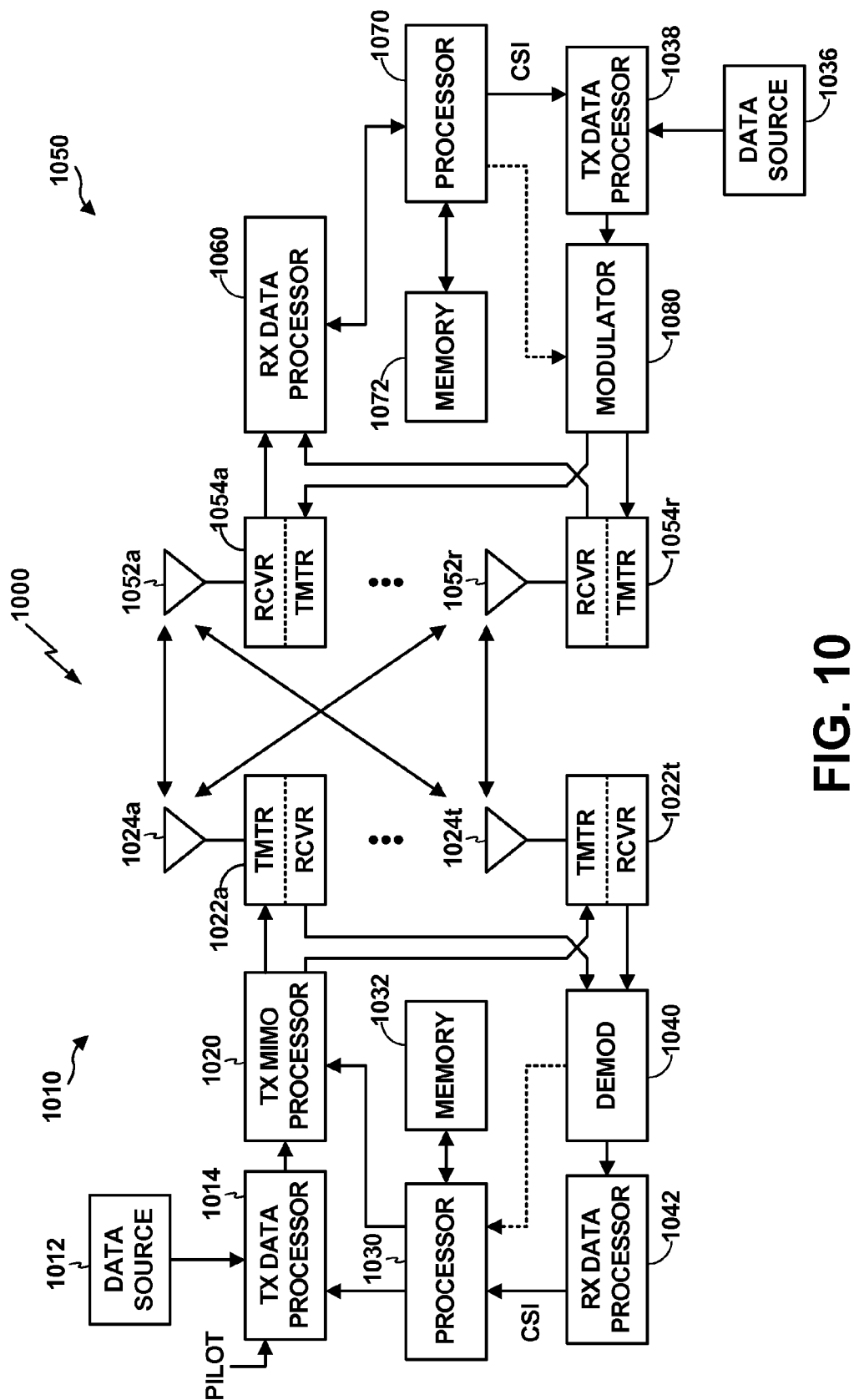
FIG. 10 is an illustration of an example wireless network environment that can be employed in conjunction with the various systems and methods described herein.

FIG. 10 shows an exemplary wireless communication system 1000. The wireless communication system 1000 depicts one base station 1010, which can include a small-cell node, and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems and/or methods described herein to facilitate wireless communication there between. For example, components or functions of the systems and/or methods described herein can be part of a memory 1032 and/or 1072 or processors 1030 and/or 1070 described below, and/or can be executed by processors 1030 and/or 1070 to perform the disclosed functions.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various aspects, TX MIMO processor 1020 applies beamforming weights to the symbols of the data streams and to the antenna from which the symbol is being transmitted.

Each receiver 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 754 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform functionalities described herein to support selecting a paging area identifier for one or more access points.

Figure 11:
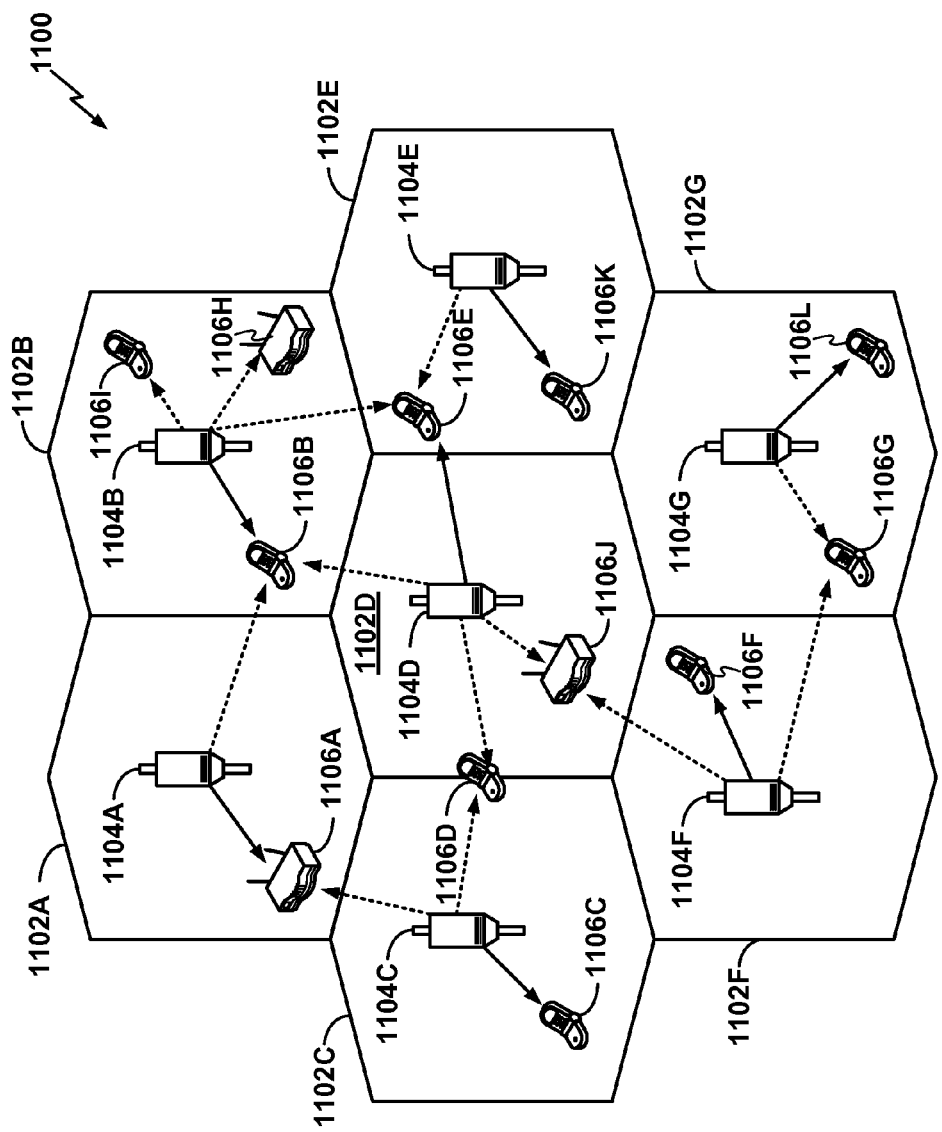
FIG. 11 illustrates an example wireless communication system, configured to support a number of devices, in which the aspects herein can be implemented.

FIG. 11 illustrates a wireless communication system 1100, configured to support a number of users, in which the teachings herein may be implemented. The system 1100 provides communication for multiple cells 1102, such as, for example, macro cells 1102A-1102G, with each cell being serviced by a corresponding access node 1104 (e.g., access nodes 1104A-1104G). As shown in FIG. 11, mobile devices 1106 (e.g., mobile devices 1106A-1106L) can be dispersed at various locations throughout the system over time. Each mobile device 1106 can communicate with one or more access nodes 1104 on a forward link (FL) and/or a reverse link (RL) at a given moment, depending upon whether the mobile device 1106 is active and whether it is in soft handoff, for example. The wireless communication system 1100 can provide service over a large geographic region. In some aspects, some of the mobile devices 1106, such as devices 1106A, 1106H, and 1106J, may be small-cell nodes, such as nodes 102 or 202 or system 500, and may include the components and implement the functions described above with respect to FIGS. 1-8.

Figure 12:
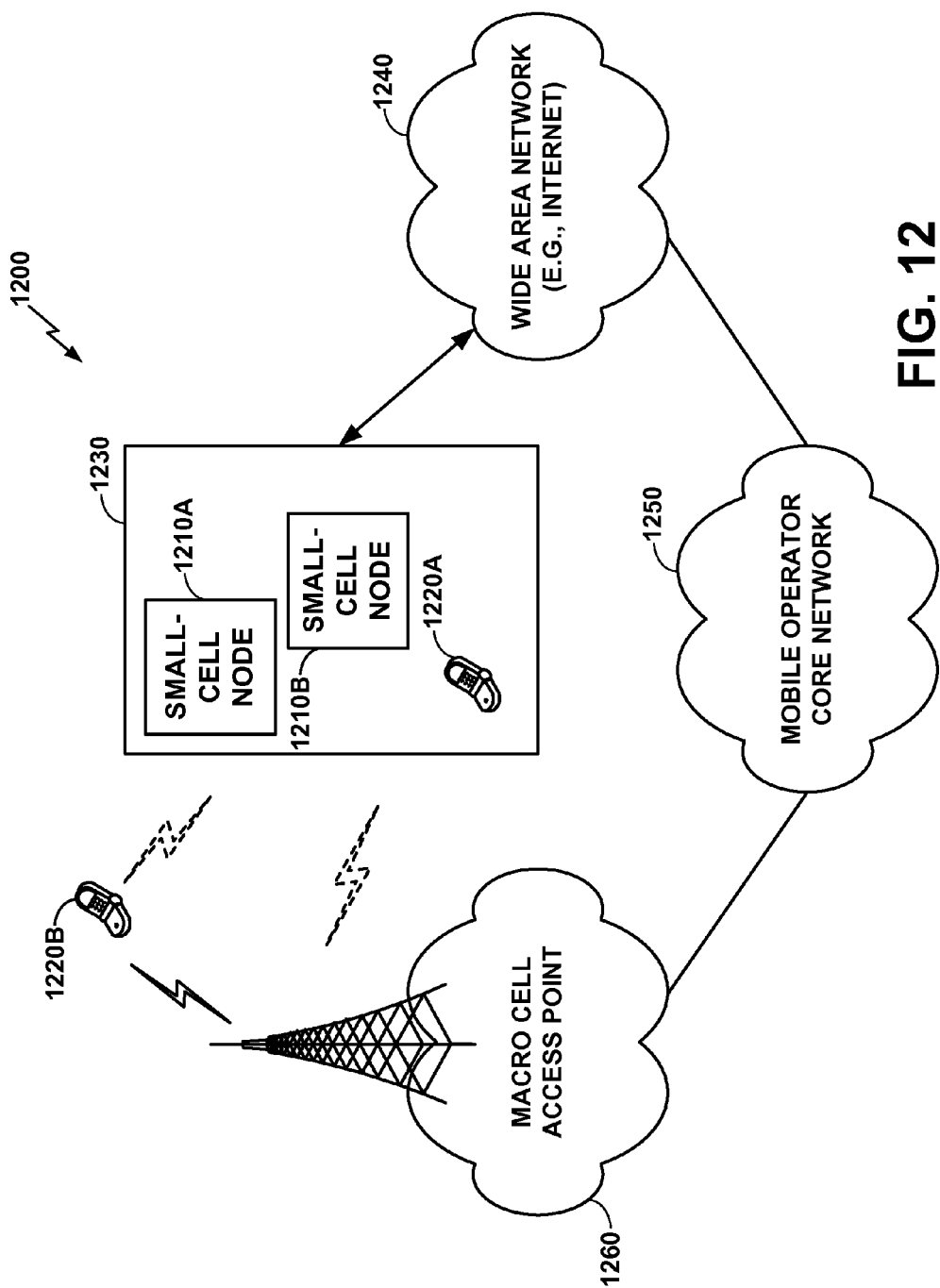
FIG. 12 is an illustration of an exemplary communication system to enable deployment of small cells within a network environment.

FIG. 12 illustrates an exemplary communication system 1200 where one or more small-cell nodes are deployed within a network environment. Specifically, the system 1200 includes multiple small-cell nodes 1210A and 1210B (e.g., femtocell nodes or H(e)NB) installed in a relatively small-scale network environment (e.g., in one or more user residences 1230), which, in one aspect, may correspond to small-cell nodes 104, 106, 108, 110, and 112 of FIGS. 1-8. Each small-cell node 1210 can be coupled to a wide area network 1240 (e.g., the Internet) and a mobile operator core network 1250 via a digital subscriber line (DSL) router, a cable modem, a wireless link, or other connectivity means (not shown). As will be discussed below, each small-cell node 1210 can be configured to serve associated mobile devices 1220 (e.g., mobile device 1220A) and, optionally, alien mobile devices 1220 (e.g., mobile device 1220B). In other words, access to small-cell nodes 1210 can be restricted such that a given mobile device 1220 can be served by a set of designated (e.g., home) small-cell node(s) 1210 but may not be served by any non-designated small-cell nodes 1210 (e.g., a neighbor's small-cell node).

Figure 13:
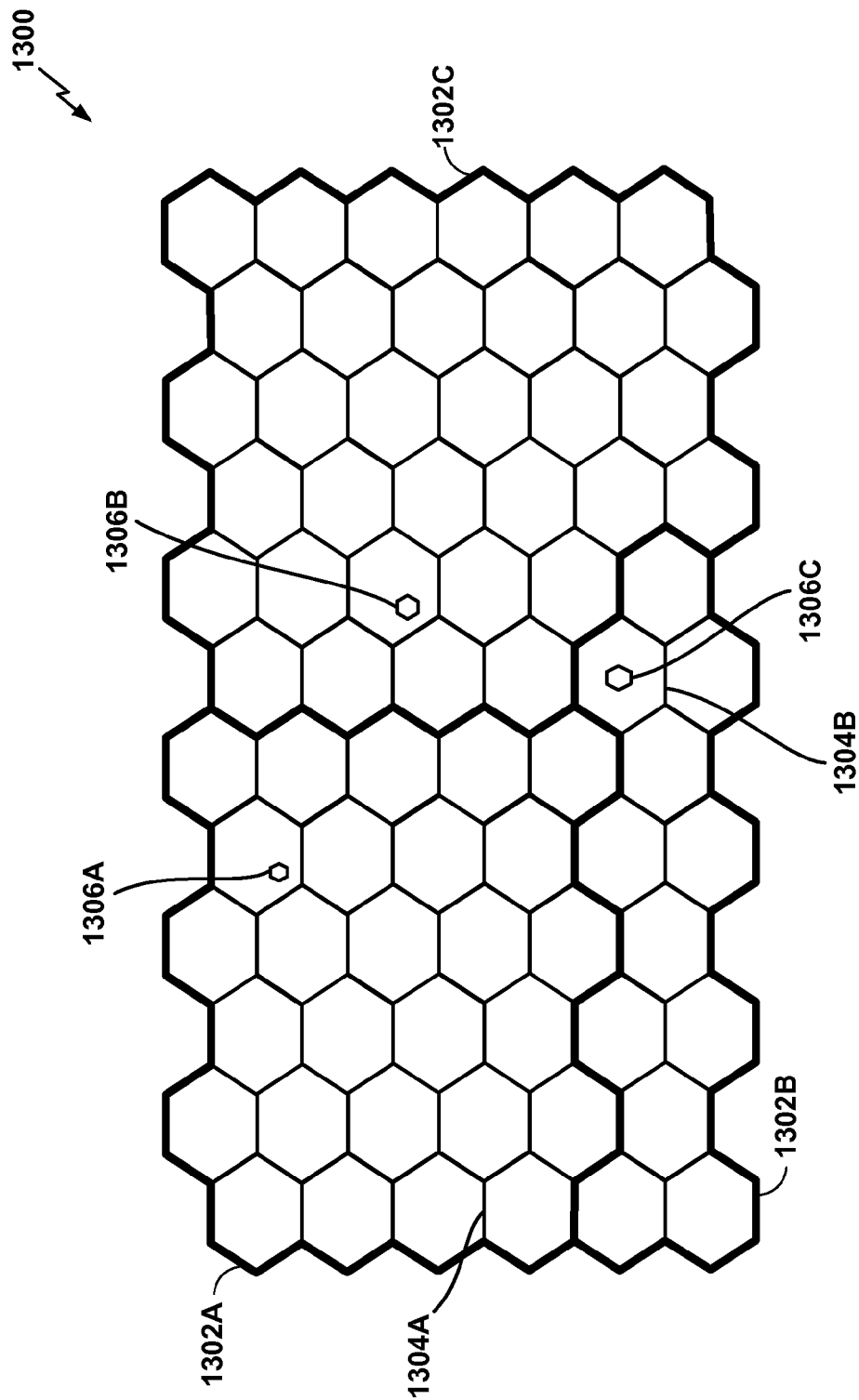
FIG. 13 illustrates an example of a coverage map having several defined tracking areas.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306 corresponding to respective small-cell nodes, such as nodes 102 or 202 or system 500, and which may include the components and implement the functions described above with respect to FIGS. 1-8. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 can be defined with a given tracking area 1302 or macro coverage area 1304. Also, one or more pico coverage areas (not shown) can be defined within a given tracking area 1302 or macro coverage area 1304.

Referring again to FIG. 12, the owner of a small-cell node 1210 can subscribe to mobile service, such as, for example, 3G mobile service, offered through the mobile operator core network 1250. In another example, the small-cell node 1210 can be operated by the mobile operator core network 1250 to expand coverage of the wireless network. In addition, a mobile device 1220 can be capable of operating both in macro environments and in smaller scale (e.g., residential) network environments. Thus, for example, depending on the current location of the mobile device 1220, the mobile device 1220 can be served by a macro cell access node 1260 or by any one of a set of small-cell nodes 1210 (e.g., the small-cell nodes 1210A and 1210B that reside within a corresponding user residence 1230). For example, when a subscriber is outside his home, he is served by a standard macro cell access node (e.g., node 1260) and when the subscriber is at home, he is served by a small-cell node (e.g., node 1210A). Here, it should be appreciated that a small-cell node 1210 can be backward compatible with existing mobile devices 1220.

A small-cell node 1210 can be deployed on a single frequency or, in the alternative, on multiple frequencies. Depending on the particular configuration, the single frequency or one or more of the multiple frequencies can overlap with one or more frequencies used by a macro cell access node (e.g., node 1260). In some aspects, a mobile device 1220 can be configured to connect to a preferred small-cell node (e.g., the home small-cell node of the mobile device 1220) whenever such connectivity is possible. For example, whenever the mobile device 1220 is within the user's residence 1230, it can communicate with the home small-cell node 1210.

In some aspects, if the mobile device 1220 operates within the mobile operator core network 1250 but is not residing on its most preferred network (e.g., as defined in a preferred roaming list), the mobile device 1220 can continue to search for the most preferred network (e.g., small-cell node 1210) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the mobile device 1220 can limit the search for specific band and channel. For example, the search for the most preferred system can be repeated periodically. Upon discovery of a preferred small-cell node, such as small-cell node 1210, the mobile device 1220 selects the small-cell node 1210 for camping within its coverage area.

A small-cell node can be restricted in some aspects. For example, a given small-cell node can only provide certain services to certain mobile devices. In deployments with so-called restricted (or closed) association, a given mobile device can only be served by the macro cell mobile network and a defined set of small-cell nodes (e.g., the small-cell nodes 1210 that reside within the corresponding user residence 1230). In some implementations, a small-cell node can be restricted to not provide, for at least one mobile device, at least one of: signaling, data access, registration, paging, or service.

In some aspects, a restricted small-cell node (which can also be referred to as a Closed Subscriber Group H(e)NB) is one that provides service to a restricted provisioned set of mobile devices. This set can be temporarily or permanently extended as necessary. In some aspects, a Closed Subscriber Group (CSG) can be defined as the set of access nodes (e.g., small-cell nodes) that share a common access control list of mobile devices. A channel on which all small-cell nodes (or all restricted small-cell nodes) in a region operate can be referred to as a femto channel.

Various relationships can thus exist between a given small-cell node and a given mobile device. For example, from the perspective of a mobile device, an open small-cell node can refer to a small-cell node with no restricted association. A restricted small-cell node can refer to a small-cell node that is restricted in some manner (e.g., restricted for association and/or registration). A home small-cell node can refer to a small-cell node on which the mobile device is authorized to access and operate on. A guest small-cell node can refer to a small-cell node on which a mobile device is temporarily authorized to access or operate on. An alien small-cell node can refer to a small-cell node on which the mobile device is not authorized to access or operate on, except for perhaps emergency situations (e.g., 911 calls).

From a restricted small-cell node perspective, a home mobile device can refer to a mobile device that authorized to access the restricted small-cell node. A guest mobile device can refer to a mobile device with temporary access to the restricted small-cell node. An alien mobile device can refer to a mobile device that does not have permission to access the restricted small-cell node, except for perhaps emergency situations, for example, 911 calls (e.g., an access terminal that does not have the credentials or permission to register with the restricted small-cell node).

For convenience, the disclosure herein describes various functionality in the context of a small-cell node. It should be appreciated, however, that a pico node can provide the same or similar functionality as a small-cell node, but for a larger coverage area. For example, a pico node can be restricted, a home pico node can be defined for a given mobile device, and so on. The present disclosure is also applicable to other base station types besides small-cell nodes and pico nodes.

The systems and/or methodologies described herein are merely exemplary; the systems and methodologies of the present disclosure are not limited to any particular type of mobile device, base station, or network, and may be used in conjunction with any type of wireless communication technology.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that may carry or store desired program code in the form of instructions or data structures and that can be accessed by a computer. Disk and disc, as used herein, includes compact disc (CD), laser disc, optical disc, digital versatile disc (DVD), floppy disk and Bluray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for enhancing assignment of mobility classifications to mobile devices, the method comprising:
    storing a plurality of mobility classifications in association with one or more mobile devices, wherein the mobility classifications indicate, for each mobile device, one or more handover parameters used by the mobile device;
    updating the one or more handover parameters associated with the plurality of mobility classifications based on mobility events;
    making an error determination that at least one of the one or more mobile devices is erroneously associated with the mobility classifications based on the one or more updated handover parameters for the plurality of mobility classifications; and
    establishing, in response to the error determination, one or more new criteria that adjust how the mobility classifications are assigned.

2. The method of claim 1, wherein storing the plurality of mobility classifications comprises storing a first mobility classification in association with a first subset of the one or more mobile devices and a second mobility classification in association with a second subset of the one or more mobile devices.

3. The method of claim 2, wherein the first mobility classification comprises a non-ping-pong user classification and the second mobility classification comprises a ping-pong user classification.

4. The method of claim 2, further comprising, prior to making the error determination:
    applying one or more initial criteria to the mobile devices; and
    associating the first subset with the first mobility classification and the second subset with the second mobility classification based on results of applying the one or more initial criteria.

5. The method of claim 4, wherein a previous serving cells history exists in association with each of the mobile devices, wherein each previous serving cells history comprises data regarding one or more previous serving cells of the mobile device, and wherein applying the one or more initial criteria comprises:
    analyzing the previous serving cells histories to identify one or more mobile devices that have a certain repetition of one or more serving cells in a certain number of previous serving cells; and
    assigning the second mobility classification to each mobile device that has the certain repetition of one or more serving cells in the certain number of previous serving cells.

6. The method of claim 5, wherein a previous serving cells history of a mobile device comprises user equipment (UE) History Information.

7. The method of claim 5, wherein the one or more new criteria relate to one or more of:
    more repetition of one or more serving cells in a certain number of cell changes;
    less repetition of one or more serving cells in a certain number of cell changes;
    a higher ratio of repetition of one or more serving cells in the previous serving cells history;
    a lower ratio of repetition of one or more serving cells in the previous serving cells history; or
    combinations thereof.

8. The method of claim 5, further comprising assigning the first mobility classification to each mobile device that does not have repetition of a serving cell in the certain number of previous cells.

9. The method of claim 2, further comprising, prior to making the error determination:
    receiving data regarding communication of the one or more mobile devices with base stations; and
    analyzing the data to identify mobility events and ping-pong handovers.

10. The method of claim 9, further comprising, prior to making the error determination:
    storing a first initial set of handover parameters that influence management of handovers of the first subset between the base stations; and
    storing a second initial set of handover parameters that influence management of handovers of the second subset between the base stations.

11. The method of claim 10, further comprising storing, in response to identifying the at least one event, at least one of:
    a first new set of handover parameters that supplements or replaces the first initial set of handover parameters to influence management of handovers of the first subset between the base stations;
    a second new set of handover parameters that supplements or replaces the second initial set of handover parameters to influence management of handovers of the second subset between the base stations; or
    combinations thereof.

12. The method of claim 11, wherein making the error determination comprises:
    comparing the first new set of handover parameters with the first initial set of handover parameters to conclude that the first new set of handover parameters is less permissive of handovers between the base stations than the first initial set of handover parameters; and
    determining, in response to the conclusion, that one or more mobile devices of the first subset are erroneously associated with the first mobility classification.

13. The method of claim 11, wherein making the error determination comprises:
    comparing the second new set of handover parameters with the second initial set of handover parameters to conclude that the second new set of handover parameters is more permissive of handovers between the base stations than the second initial set of handover parameters; and
    determining, in response to the conclusion, that one or more mobile devices of the second subset are erroneously associated with the second mobility classification.

14. The method of claim 11, wherein making the error determination comprises:
    comparing the first new set of handover parameters with the second new set of handover parameters to observe a reduction in difference between at least one handover parameter of the first new set of handover parameters and at least one handover parameter of the second new set of handover parameters; and
    determining, in response to the observation, that one or more mobile devices of the first subset are erroneously associated with the first mobility classification or one or more mobile devices of the second subset are erroneously associated with the second mobility classification.

15. The method of claim 2, wherein making the error determination comprises determining that one or more mobile devices of the first subset are erroneously associated with the first mobility classification, wherein, compared with one or more initial criteria used to assign the second mobility classification to the second subset, the one or more new criteria facilitate assignment of the second mobility classification to the one or more mobile devices.

16. The method of claim 2, wherein making the error determination comprises determining that one or more mobile devices of the second subset are erroneously associated with the second mobility classification, wherein, compared with one or more initial criteria used to assign the first mobility classification to the first subset, the one or more new criteria facilitate assignment of the first mobility classification to the one or more mobile devices.

17. The method of claim 2, wherein making the error determination further comprises determining that one or more mobile devices of the first subset are erroneously associated with the first mobility classification and one or more mobile devices of the second subset are erroneously associated with the second mobility classification, wherein, compared with one or more initial criteria used to assign the first mobility classification to the first subset, the one or more new criteria facilitate assignment of the first mobility classification to the one or more mobile devices.

18. The method of claim 2, further comprising:
storing the one or more new criteria; and
applying the one or more new criteria to assign one of the first mobility classification and the second mobility classification to the one or more mobile devices.

19. An apparatus for enhancing assignment of mobility classifications to mobile devices, the apparatus comprising:
a memory configured to store a plurality of mobility classifications in association with one or more mobile devices, wherein the mobility classifications indicate, for each mobile device, one or more handover parameters used by the mobile device; and
a hardware processor, communicatively coupled to the memory, configured to perform the steps of:
updating the one or more handover parameters associated with the plurality of mobility classifications based on mobility events;
making an error determination that at least one of the one or more mobile devices is erroneously associated with the mobility classifications based on the one or more updated handover parameters for the plurality of mobility classifications; and
establishing, in response to the error determination, one or more new criteria that adjust how the mobility classifications are assigned.

20. The apparatus of claim 19, wherein storing the plurality of mobility classifications comprises storing a first mobility classification in association with a first subset of the one or more mobile devices and a second mobility classification in association with a second subset of the one or more mobile devices.

21. The apparatus of claim 20, wherein the hardware processor is further configured to perform, prior to making the error determination, the steps of:
applying one or more initial criteria to the mobile devices; and
associating the first subset with the first mobility classification and the second subset with the second mobility classification based on results of applying the one or more initial criteria.

22. The apparatus of claim 21, wherein a previous serving cells history exists in association with each of the mobile devices, wherein each previous serving cells history comprises data regarding one or more previous serving cells of the mobile device, and wherein applying the one or more initial criteria comprises:
analyzing the previous serving cells histories to identify one or more mobile devices that have a certain repetition of one or more serving cells in a certain number of previous serving cells; and
assigning the second mobility classification to each mobile device that has the certain repetition of one or more serving cells in the certain number of previous serving cells.

23. The apparatus of claim 22, wherein the one or more new criteria relate to one or more of:
more repetition of one or more serving cells in a certain number of cell changes;
less repetition of one or more serving cells in a certain number of cell changes;
a higher ratio of repetition of one or more serving cells in the previous serving cells history;
a lower ratio of repetition of one or more serving cells in the previous serving cells history; or
combinations thereof.

24. The apparatus of claim 22, wherein the hardware processor is further configured to perform the step of assigning the first mobility classification to each mobile device that does not have repetition of a serving cell in the certain number of previous cells such that one of the first mobility classification and the second mobility classification is assigned to each of the one or more mobile devices.

25. The apparatus of claim 20, wherein the hardware processor is further configured to perform, prior to making the error determination, the steps of:
receiving data regarding communication of the one or more mobile devices with base stations; and
analyzing the data to identify mobility events and ping-pong handovers.

26. The apparatus of claim 25, wherein the hardware processor is further configured to perform, prior to making the error determination, the steps of:
storing a first initial set of handover parameters that influence management of handovers of the first subset between the base stations; and
storing a second initial set of handover parameters that influence management of handovers of the second subset between the base stations.

27. The apparatus of claim 26, wherein the hardware processor is further configured to perform the step of storing, in response to identifying the at least one event, at least one of:
a first new set of handover parameters that supplements or replaces the first initial set of handover parameters to influence management of handovers of the first subset between the base stations;
a second new set of handover parameters that supplements or replaces the second initial set of handover parameters to influence management of handovers of the second subset between the base stations; or
combinations thereof.

28. The apparatus of claim 20, wherein the hardware processor is further configured to perform the steps of:
- storing the one or more new criteria; and
- applying the one or more new criteria to assign one of the first mobility classification and the second mobility classification to the one or more mobile devices.

29. An apparatus for enhancing assignment of mobility classifications to mobile devices, the apparatus comprising:
- means for storing a plurality of mobility classifications in association with one or more mobile devices, wherein the mobility classifications indicate, for each mobile device, one or more handover parameters used by the mobile device;
- means for updating the one or more handover parameters associated with the plurality of mobility classifications based on mobility events;
- means for making an error determination that at least one of the one or more mobile devices is erroneously associated with the mobility classifications based on the one or more updated handover parameters for the plurality of mobility classifications; and
- means for establishing, in response to the error determination, one or more new criteria that adjust how the mobility classifications are assigned.

30. A non-transitory computer-readable medium comprising codes for causing a computer to:
- store a plurality of mobility classifications in association with one or more mobile devices, wherein the mobility classifications indicate, for each mobile device, one or more handover parameters used by the mobile device;
- update the one or more handover parameters associated with the plurality of mobility classifications based on mobility events;
- make an error determination that at least one of the one or more mobile devices is erroneously associated with the mobility classifications based on the one or more updated handover parameters for the plurality of mobility classifications; and
- establish, in response to the error determination, one or more new criteria that adjust how the mobility classifications are assigned.

* * * * *